(12) United States Patent
Beaudin

(10) Patent No.: US 12,319,592 B2
(45) Date of Patent: Jun. 3, 2025

(54) SYSTEM, METHOD AND APPARATUS FOR THERMODYNAMICALLY OPTIMAL DISTILLATION OF WATER OR OTHER LIQUIDS

(71) Applicant: Alexandre S. Beaudin, Fremont, CA (US)

(72) Inventor: Alexandre S. Beaudin, Fremont, CA (US)

(73) Assignee: Alexandre S. Beaudin, Fremont, CA (US)

( * ) Notice: Subject to any disclaimer, the term of this patent is extended or adjusted under 35 U.S.C. 154(b) by 412 days.

(21) Appl. No.: 17/693,450

(22) Filed: Mar. 14, 2022

(65) Prior Publication Data

US 2022/0289595 A1    Sep. 15, 2022

Related U.S. Application Data

(60) Provisional application No. 63/161,370, filed on Mar. 15, 2021.

(51) Int. Cl.
  *C02F 1/04*    (2023.01)
  *B01D 1/28*    (2006.01)
  *C02F 103/08*  (2006.01)

(52) U.S. Cl.
  CPC .............. *C02F 1/041* (2013.01); *B01D 1/28* (2013.01); *C02F 1/043* (2013.01); *C02F 2103/08* (2013.01); *C02F 2201/002* (2013.01); *C02F 2201/005* (2013.01); *C02F 2209/02* (2013.01); *C02F 2209/03* (2013.01)

(58) Field of Classification Search
  CPC . C02F 1/041; C02F 1/043; B01D 1/28; B01D 3/00
  See application file for complete search history.

(56) References Cited

U.S. PATENT DOCUMENTS

| | | | | |
|---|---|---|---|---|
| 4,555,307 A | * | 11/1985 | Hagen ................... | F04B 19/027 |
| | | | | 202/205 |
| 2002/0117293 A1 | * | 8/2002 | Campbell ................ | B01D 1/22 |
| | | | | 165/133 |
| 2016/0341224 A1 | * | 11/2016 | Lynn ........................ | F28B 1/06 |
| 2017/0349451 A1 | * | 12/2017 | Lockwood ............. | B01D 3/007 |
| 2019/0329152 A1 | * | 10/2019 | Govindan .............. | B01D 5/006 |

* cited by examiner

*Primary Examiner* — Renee Robinson

(57) ABSTRACT

A novel mechanical vapor recompression system is proposed which offers improved energy efficiency. As opposed to a process using an adiabatic compression step, the proposed system recompresses the vapor with concurrent heat transfer back to the evaporation chamber. When the compression rate is slow relative to the heat transfer capacity between the evaporation and condensation chambers, the compression process initially follows the saturated vapor line as opposed to moving into the superheated vapor region, which results in a much lower enthalpy increase compared to an adiabatic compression step. For an identical recompression pressure, compressing saturated water vapor along the saturated vapor line has been shown to require approximately 78% less energy compared to a system employing adiabatic compression.

17 Claims, 15 Drawing Sheets

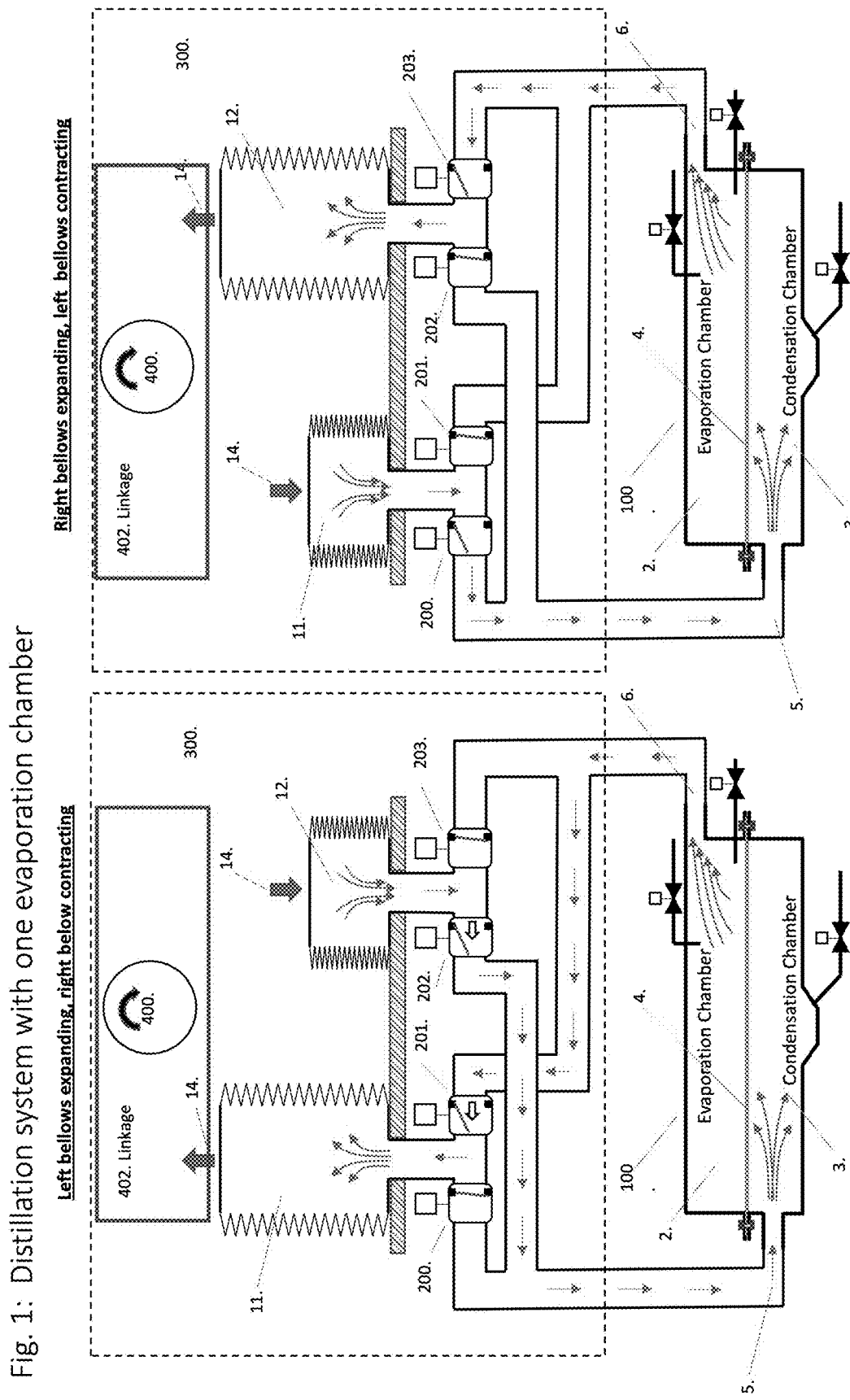
Fig. 1: Distillation system with one evaporation chamber

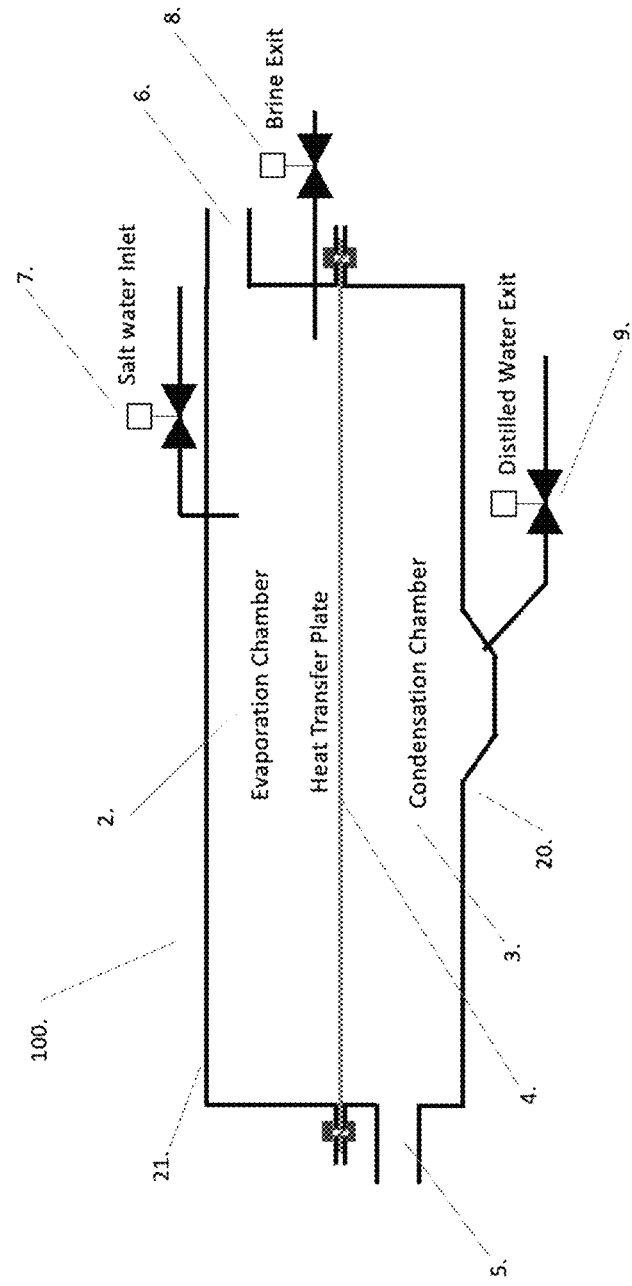
Fig. 2: Thermally Coupled Evaporation and Condensation Unit

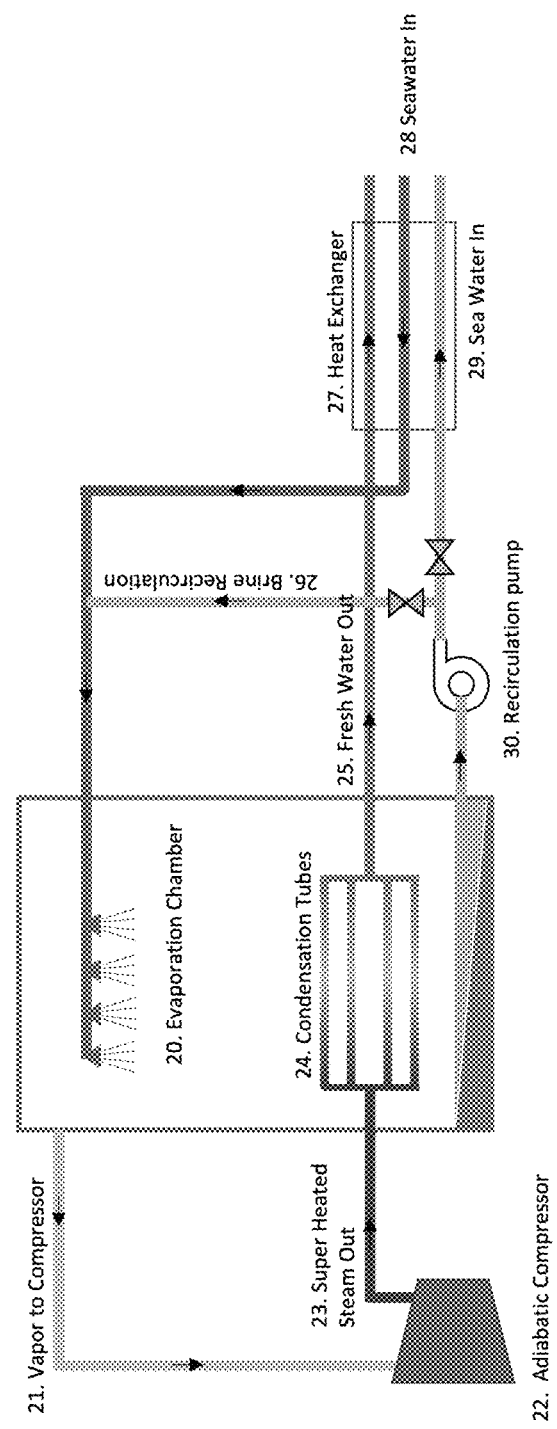
Fig. 3: Prior Art Mechanical Vapor Recompression with Adiabatic Compressor

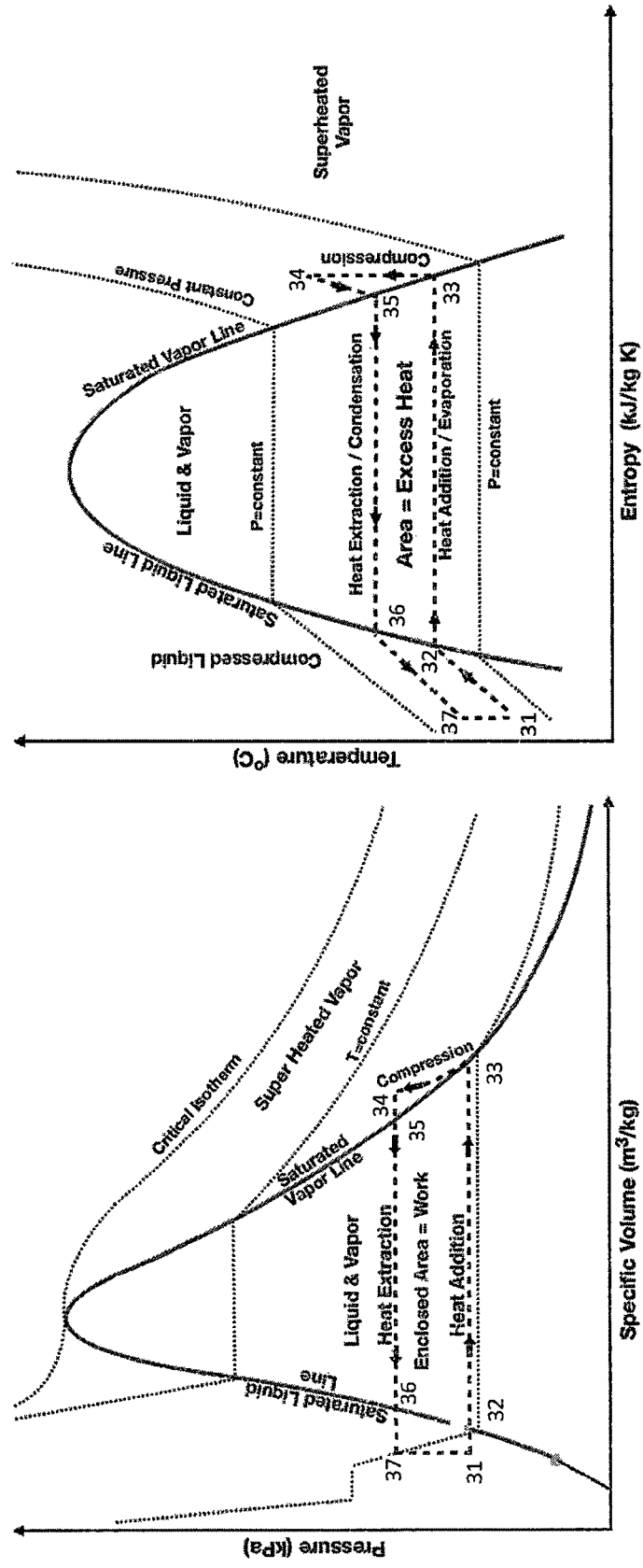

Fig. 4: PV and Ts Diagram of Mechanical Vapor Recompression System with Adiabatic Recompression Mechanical Vapor Recompression Process Steps:
31. Liquid water, entrance
32. Liquid water, enters evaporation chamber
33. Saturated steam in evaporation chamber
34. Superheated steam post adiabatic compression
35. Saturated steam in condensation tubes.
36. Saturated liquid, post condensation
37. Cooled liquid, exits The compressor must provide a quantity of work, equivalent to the enthalpy difference between points 33 and 34. Given that point 34 is superheated steam with relatively high enthalpy, this is problematic if one is striving to minimize the work and energy input.

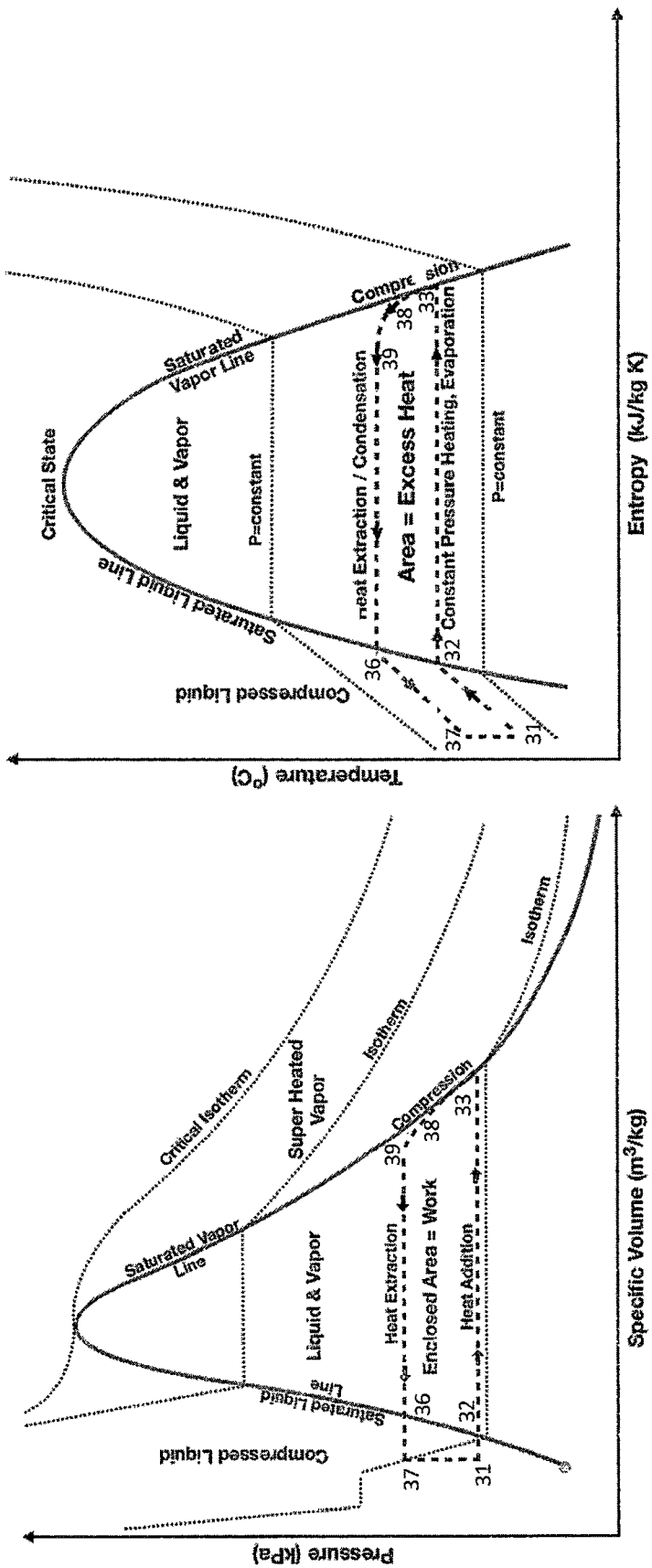

Fig. 5: PV and Ts Diagram of Mechanical Vapor Recompression System with Concurrent Heat Transfer back to Evaporator

Mechanical Vapor Recompression Process Steps:
31. Liquid Water, Entrance
32. Liquid Water, Boiling Temperature
33. Saturated Steam
38. Saturated Steam begins to liquify
39. Maximum Pressure reached
36. Saturated Liquid, Post Compression
37. Cooled Liquid, Exit The compressor must provide a quantity of work, equivalent to the enthalpy difference between points 33 and the saturated vapor at 39. For the proposed invention, since we have a two phase system with condensation, the formation of superheated steam is avoided and the enthalpy at point 39 is that of Saturated Vapor. For the same pressure increase, 78% less energy is required than if the vapor were compressed adiabatically.

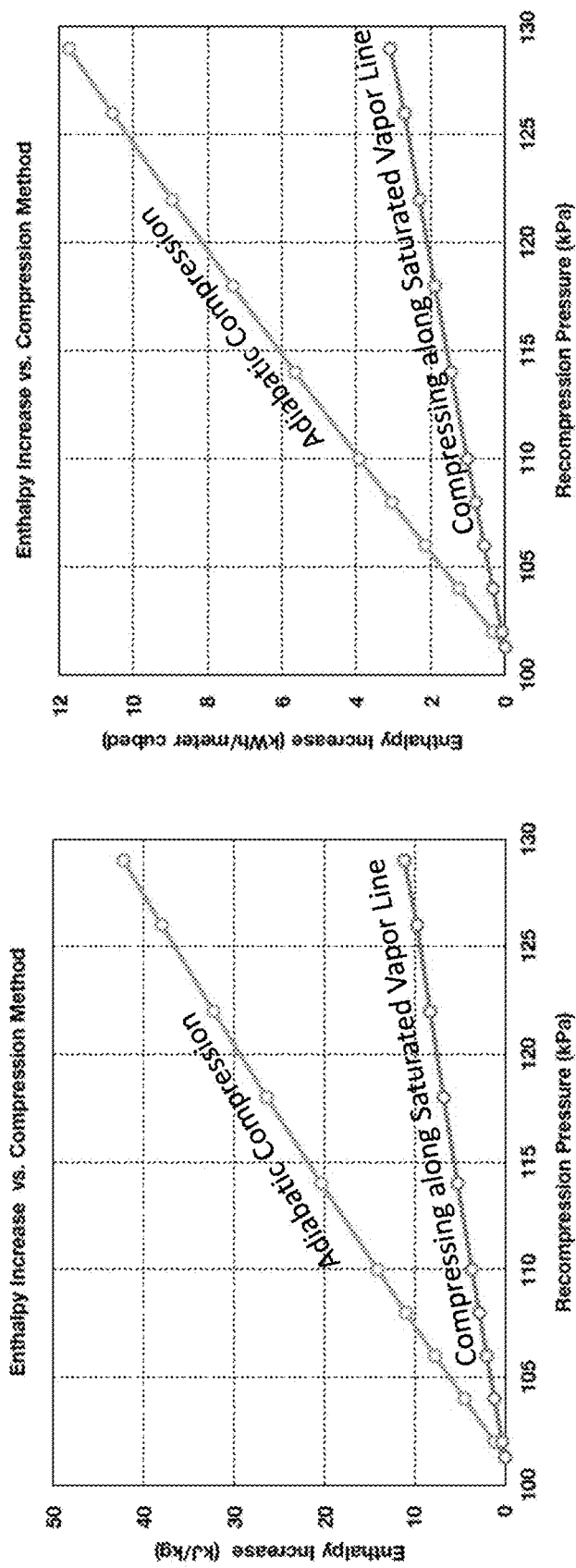
Fig. 6: Comparative Enthalpy Increase when Compressing Adiabatically or Along Saturated Vapor Line Fig. 7: Energy Requirement to Compress Water Vapor

| Parameters | Starting Condition | Scenario 1 | Scenario 2 | Scenario 3 | Scenario 4 | Scenario 4 | Scenario 5 |
|---|---|---|---|---|---|---|---|
| | 101.3 kPa saturated steam | Compress to 102.3 kPa with concurrent heat transfer back to evaporator (Saturated Steam) | Compress to 102.3 kPa Adiabatically (Super-Heated Steam) | Compress to 106.3 kPa with concurrent heat transfer back to evaporator (Saturated Steam) | Compress to 106.3 kPa Adiabatically (Super-Heated Steam) | Compress to 111.3 kPa with concurrent heat transfer back to evaporator (Saturated Steam) | Compress to 111.3 kPa Adiabatically (Super-Heated Steam) |
| Temp Post Compression (°C) | 99.97 °C | 100.24 °C | 100.836 °C | 101.323 °C | 104.25 °C | 102.63 °C | 108.38 °C |
| Evaporation/Condensation Temperature (°C) | 99.97 °C | 100.24 °C | 100.24 °C | 101.323 °C | 101.323 °C | 102.63 °C | 102.63 °C |
| Enthalpy (MJ/kg) | 2.67501 MJ/kg | 2.67544 MJ/kg | 2.67667 MJ/kg | 2.67714 MJ/kg | 2.68322 MJ/kg | 2.67918 MJ/kg | 2.69115 MJ/kg |
| Pressure (kPa) | 101.3 kPa | 102.3 kPa | 102.3 kPa | 106.3 kPa | 106.3 kPa | 111.3 kPa | 111.3 kPa |
| Entropy (kJ/kg K) | 7.35464 kJ/kg K | 7.35134 kJ/kg K | 7.35464 kJ/kg K | 7.33846 kJ/kg K | 7.35464 kJ/kg K | 7.32304 | 7.35464 |
| Required Compressor Work (kWh/1000 kg H2O) | NA | 0.119 kWh per 1000 kg of water | 0.461 kWh per 1000 kg of water | 0.591 kWh per 1000 kg of water | 2.28 kWh per 1000 kg of water | 1.16 kWh per 1000 kg of water | 4.48 kWh per 1000 kg of water |

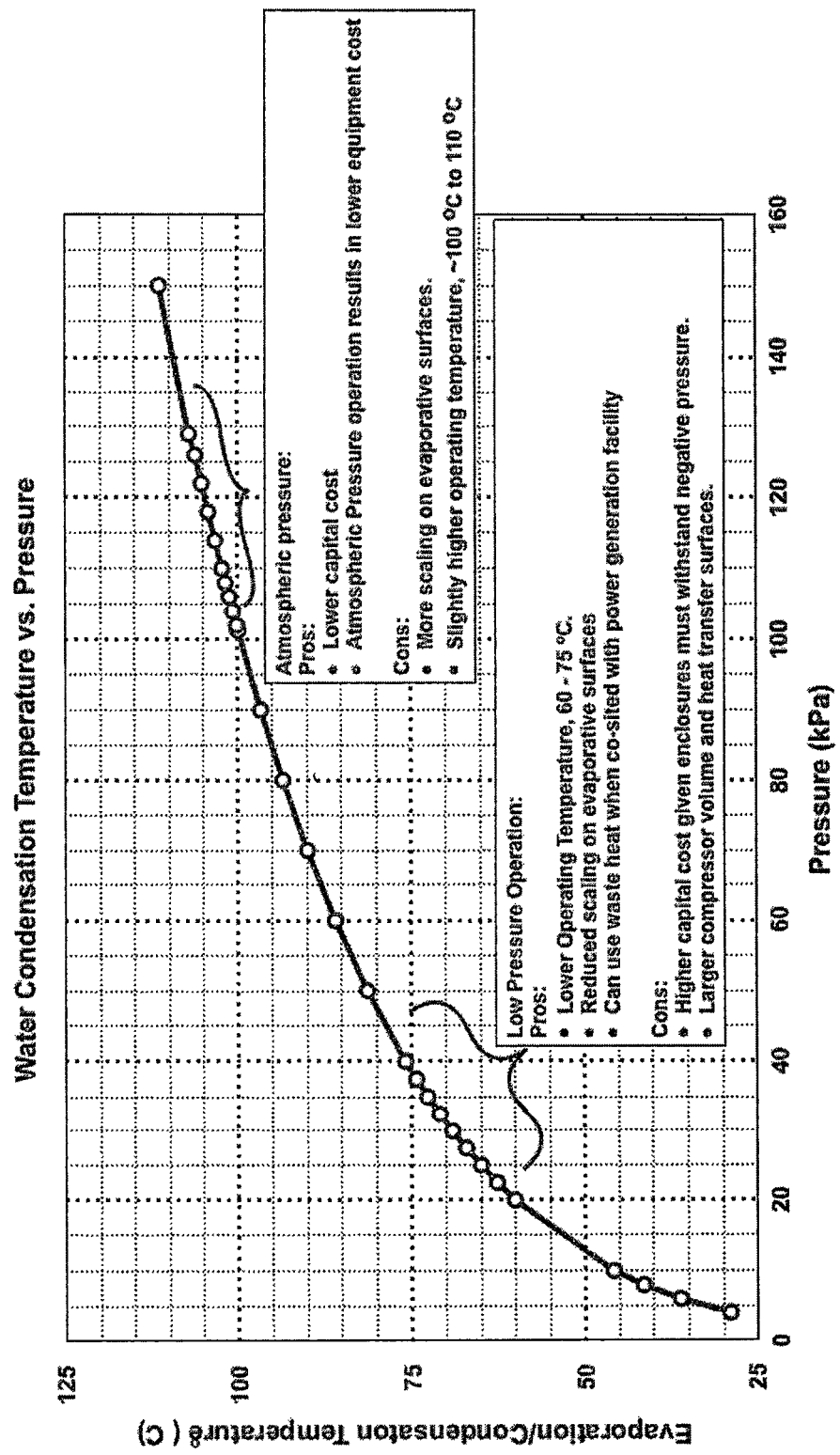
Fig. 8: Water Boiling Point vs. Pressure

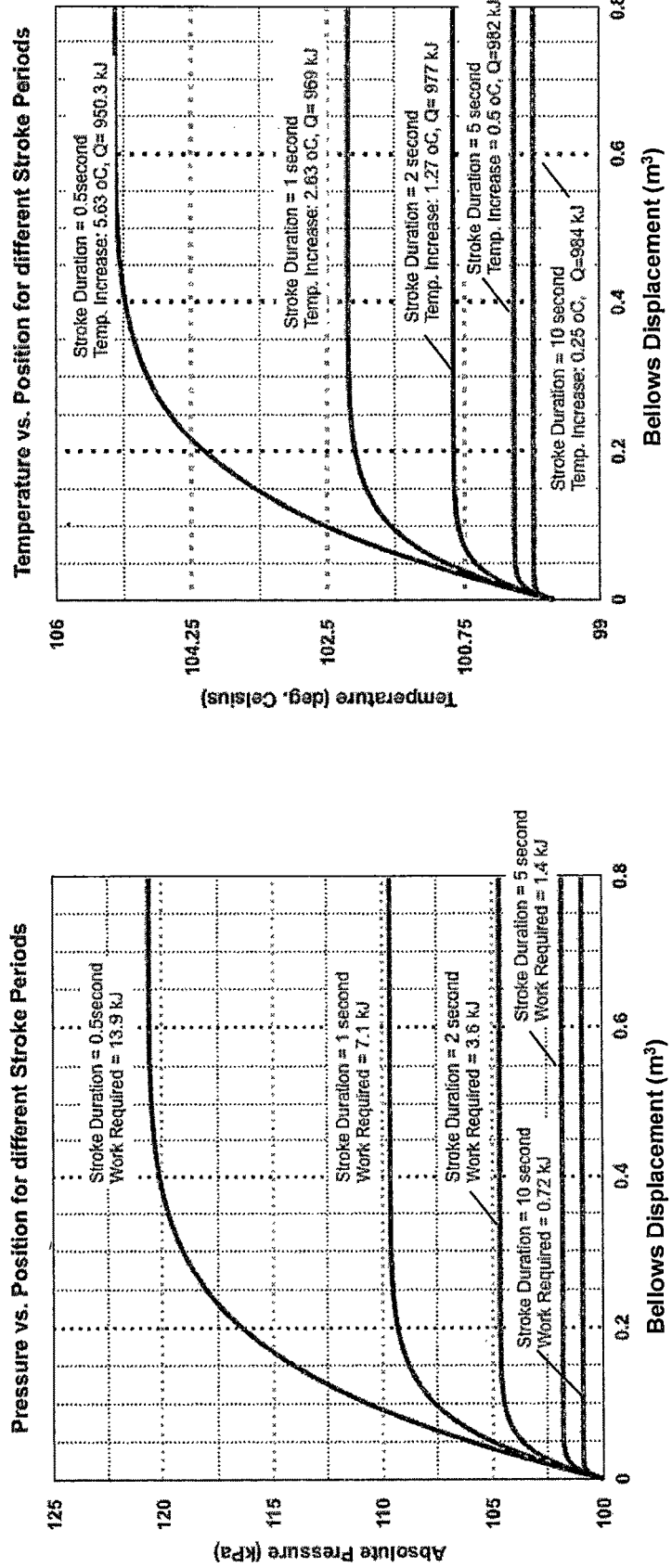
Fig. 9: Temperature and Pressure Increase vs. Compression Rate

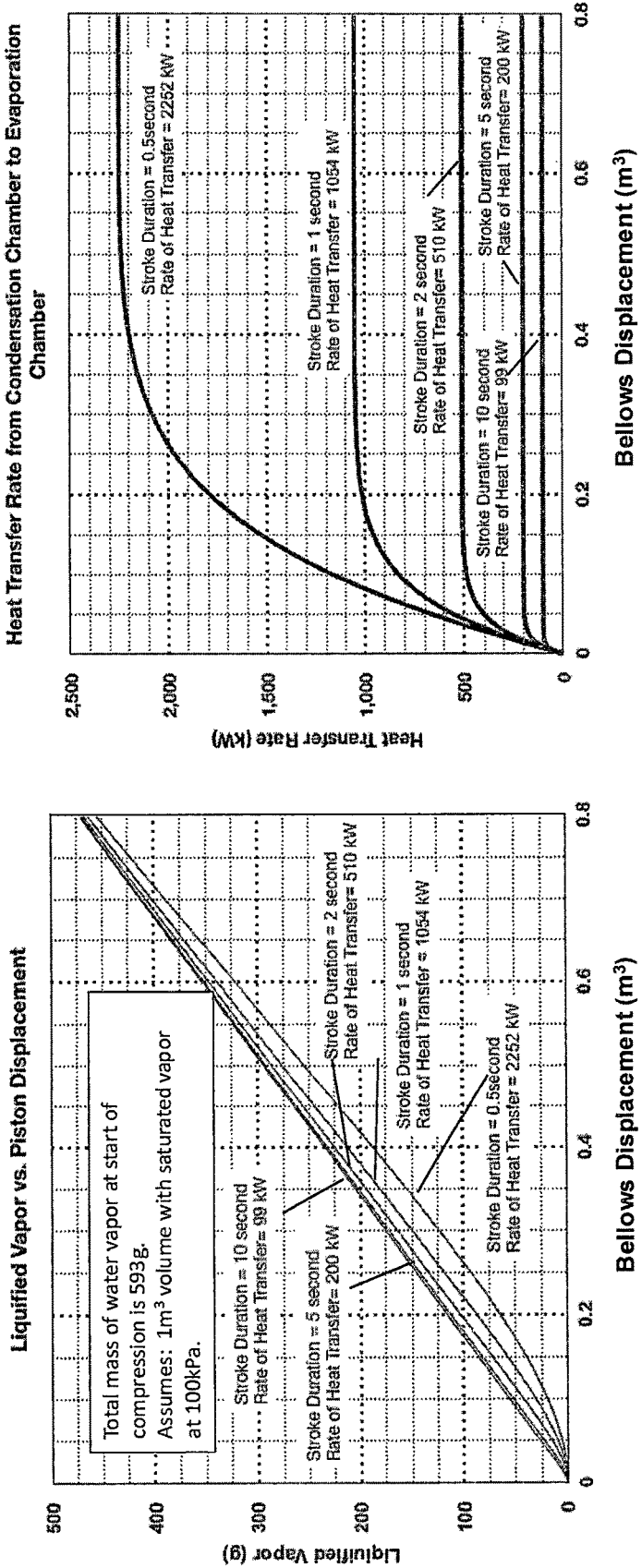

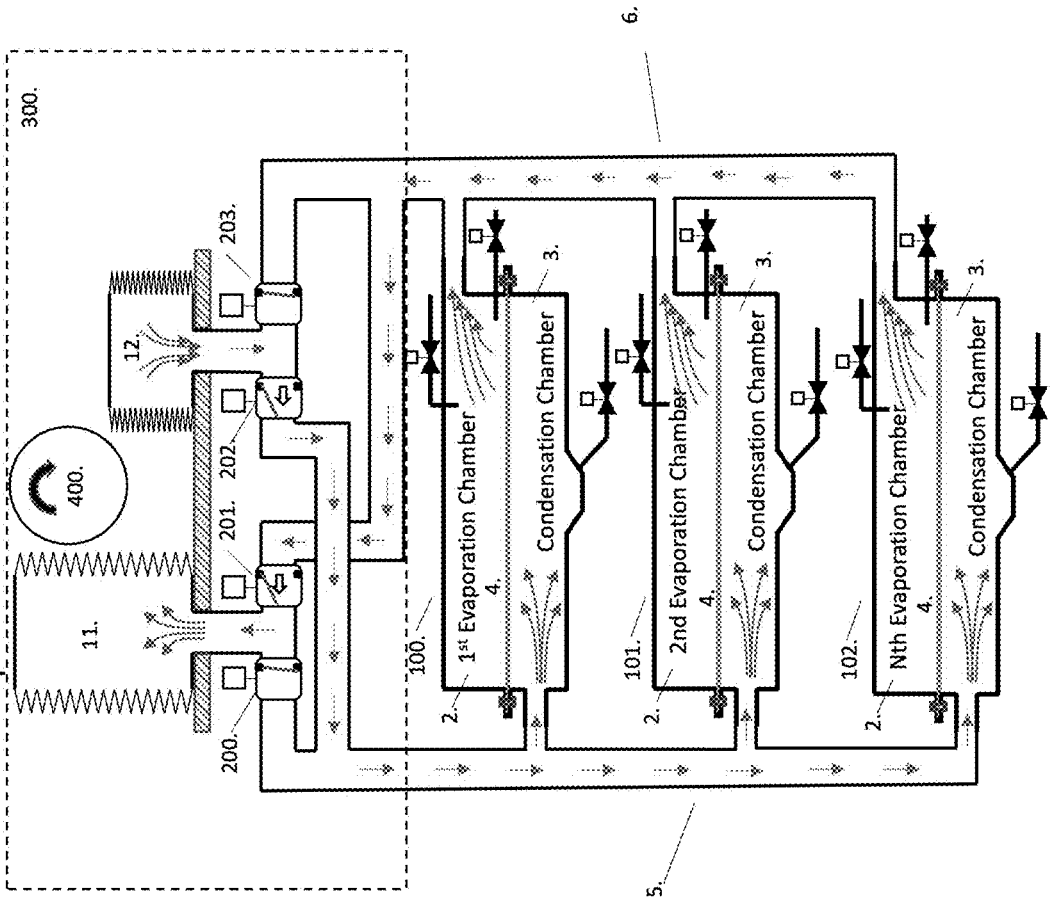
Fig. 11: Distillation System with Multiple Chambers

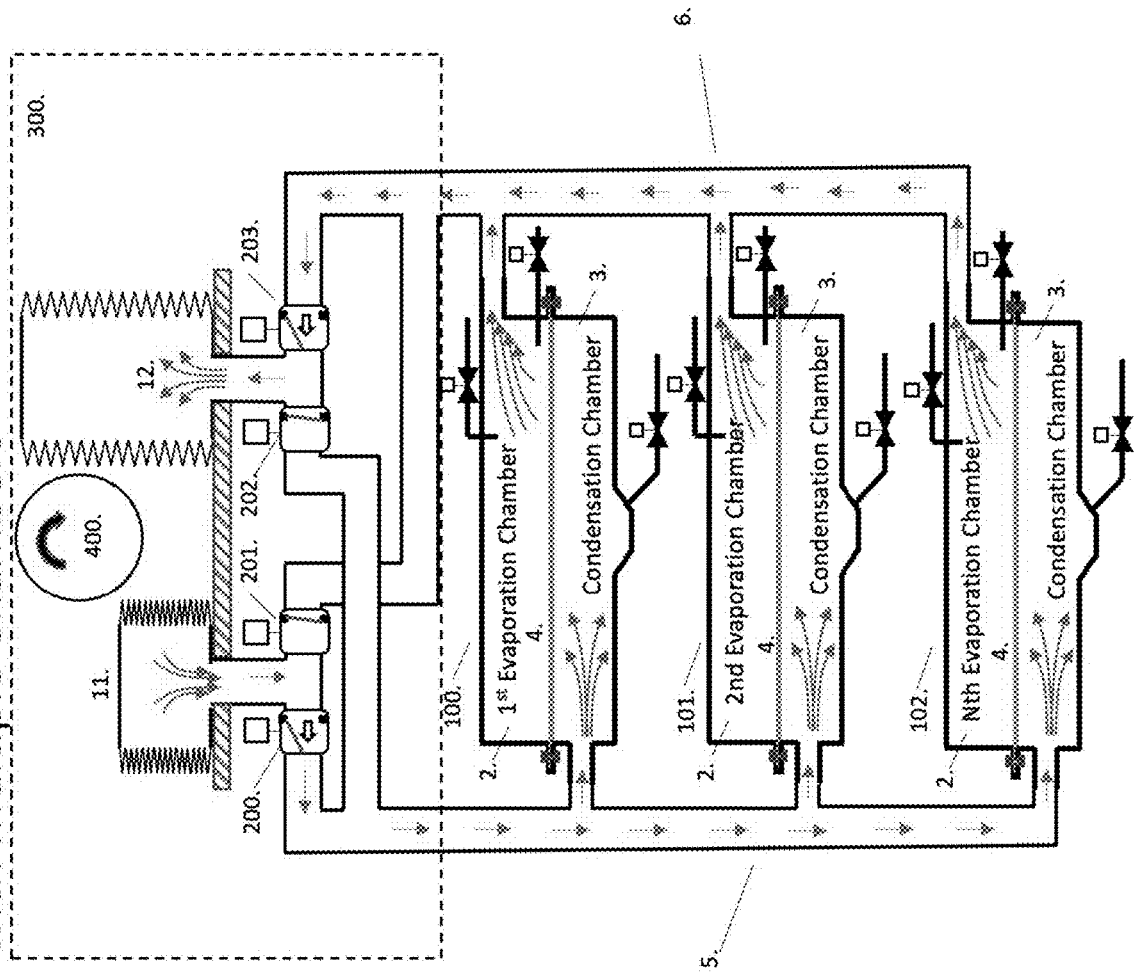
Fig. 12: Distillation System with Multiple Chambers

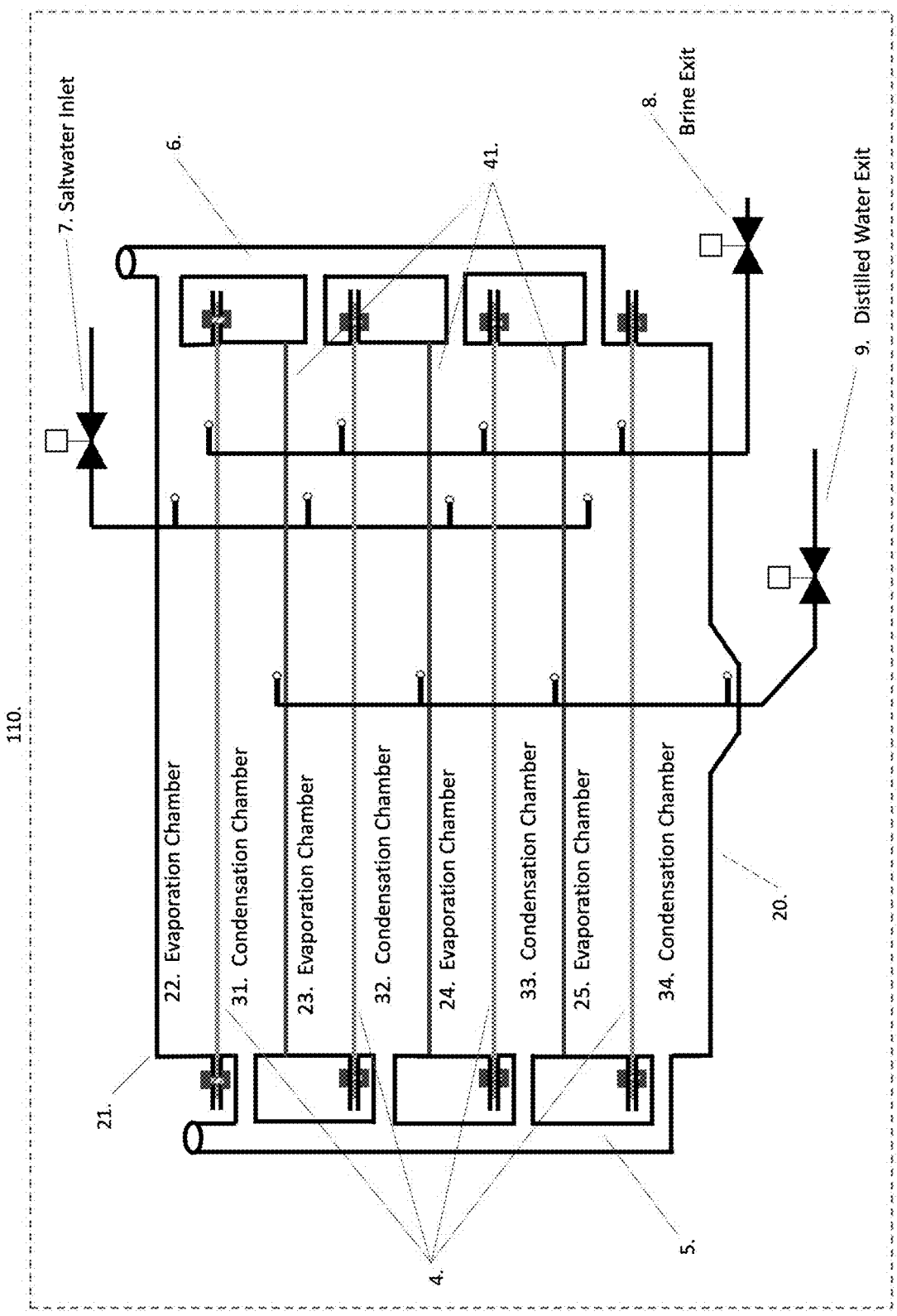
Fig. 13: Interleaved Evaporation/Condensation Chamber Unit

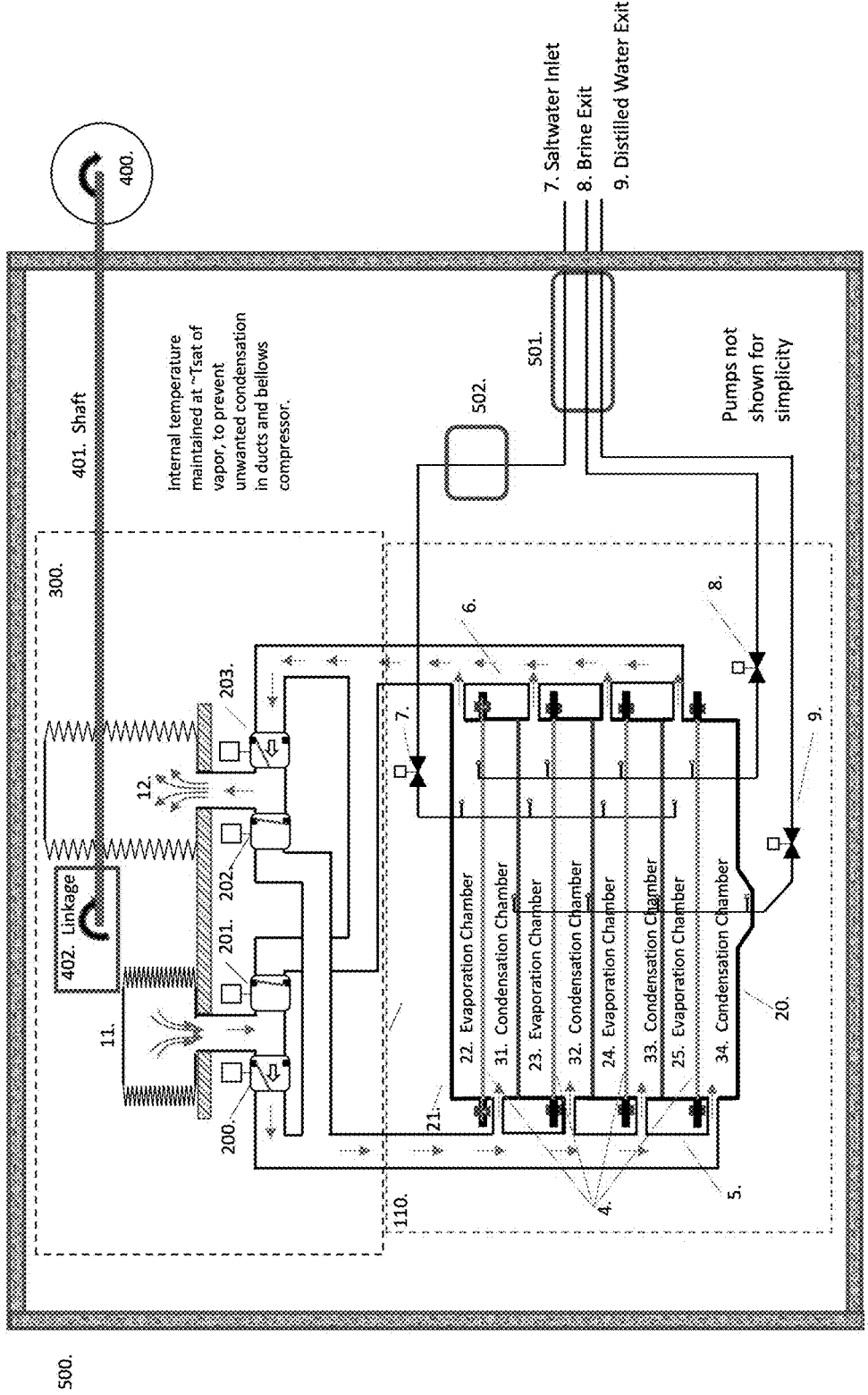
Fig. 14: Low Differential Pressure Distillation System within Thermally Insulated Structure

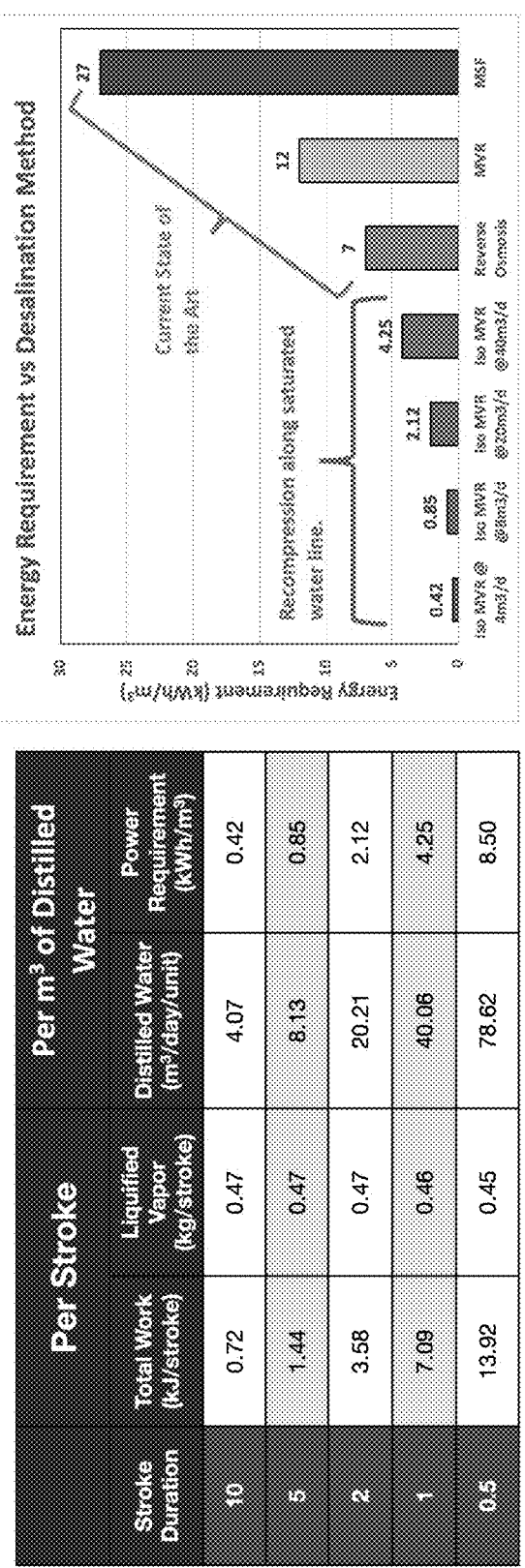
Fig. 15: Thermodynamic Efficiency of Invention vs. Prior Art

SYSTEM, METHOD AND APPARATUS FOR THERMODYNAMICALLY OPTIMAL DISTILLATION OF WATER OR OTHER LIQUIDS

CROSS REFERENCE TO RELATED APPLICATIONS

This application is a continuation of U.S. Provisional patent application 63/161,370 filed Mar. 15, 2021, entitled "System, Method and Apparatus for Thermodynamically Optimal distillation of Water or other Liquids", which is incorporated herein by reference.

TECHNICAL FIELDS

The present invention generally relates to a system, method and apparatus for distilling liquids in a more energy efficient manner than current technologies. Specific applications of the current invention would be the desalination of salt water to produce fresh water, distilling petroleum products, separating ethanol or other alcohols from water after fermentation, separating oils from organic matter in the case of biodiesel production or for extracting oils from foods, seeds or herbs, or for the production of salt or concentrated brine from salt water or any other process where it is desirable to separate liquids based on boiling temperature, or to separate liquids from solids based on evaporation.

BACKGROUND

The desalination of water is becoming an increasingly important issue globally. Many factors such as rapid population growth in developing countries, the need to increase agricultural output and changing weather patterns are all contributing factors.

Developed countries have been increasingly using desalination methods to satisfy the water shortfall where it is economically viable. The two main hurdles to larger scale desalination are the capital cost of the systems and the energy requirements to operate the desalination plant. In the Middle East where oil and thermal energy are abundant, governments have been making extensive use of thermal methods such as Multistage Flash Desalination (MSF) and Multi-Effect Distillation (MED). In countries where thermal energy is readily available due to an abundance of fossil fuels, or where the desalination plant can be co-sited with a thermal power plant, these solutions can be cost effective. In western countries, the preferred technology has been Reverse Osmosis for the last several decades due to having a reduced energy requirement and as a result these systems now account for approximately 70% of the global installed capacity of desalination systems. However, reverse osmosis systems generally involve complex maintenance to prevent membrane fouling and have larger maintenance costs per cubic meter of installed capacity than thermal methods such as MSF and MED.

Although Reverse Osmosis has the lowest energy requirement of the different desalination technologies currently in use, it nevertheless requires 5 to 7 kWh of energy per cubic meter of desalinated water. The energy is primarily used to pressurize the saltwater input to overcome the osmotic pressure of seawater across the semipermeable membrane. For sea water, depending on the specific salinity, the osmotic pressure ranges between 6 MPa and 10 MPa. Furthermore, of the salt water which is pressurized and pressed against the membrane, only about 50% ends up as a fresh water output. The remaining 50% is generally returned to the sea as brine with a higher salt concentration. As such, for every 1 $m^3$ of desalinated water, approximately 2 $m^3$ of seawater needs to be pressurized to pressures in the range of 10 MPa, resulting in 20 MJ of energy per cubic meter from this step alone. This step alone accounts for nearly 6 kWh of energy per cubic meter of desalinated water. Additional energy is required to pretreat the water and to account for dissipative effects in the pumps, electric motors and elsewhere.

In the United States, the per capital water usage is on the order of 0.5 $m^3$ per day per person. For a medium sized city with 1 million residents, approximately 0.5 million cubic meters of water are required each day. If the entire supply of water were produced by reverse osmosis, approximately 3.5 GWh of energy would be required each and every day, which is the equivalent of 146 MW used continuously over the same 24 hour period. To put this in perspective, a large hydroelectric facility such as the Hoover Dam produces on average about 456 MW. Desalinating enough water using Reverse Osmosis, to fully supply a city of 1 million residents, would require nearly $\frac{1}{3}^{rd}$ of the electrical output of the Hoover Dam. As such, energy requirements are a significant factor which needs to be considered as society and populations develop and need increasingly large quantities or desalinated water. Using desalination on a large scale to supply a significant portion of the required water would overstrain the installed power generating capacity of even the most developed countries and is currently completely out of reach of developing countries. There is therefore a long felt need for more energy efficient desalination methods.

Capital cost is also an important consideration. Based on current literature, the cost of present-day desalination systems require a capital expenditure of approximately $2000 USD per cubic meter per day of installed capacity. The Carlsbad Desalination plant in San Diego, apparently cost $1 billion USD to complete and has a capacity of 50 million gallons per day, which is roughly equivalent to 189 thousand cubic meters per day. Based on the Carlsbad plant data, the capital cost to build the plant was closer to $5000 USD per cubic meter per day of capacity. The capital expenditure is above and beyond the energy costs and maintenance cost which are incurred to operate the desalination plant. If desalination is going to become a key solution to satisfying the growing global need for water, capital cost must also be reduced, especially if the technology is needed to support the agricultural needs or developing countries.

DISCLOSURE OF THE INVENTION

The currently proposed invention comprises a novel mechanical vapor recompression system that is optimally designed to achieve an excellent thermodynamic efficiency which exceeds that of current state of the art reverse osmosis systems. Furthermore, in addition to state of the art energy efficiency, the system offers a low capital cost and low maintenance cost, typical of other thermal methods.

Prior Art Mechanical Vapor Recompression Systems use an adiabatic compression step which is relatively costly from the perspective of energy consumption. For example, prior art systems would take the water vapor from the evaporation chamber, send it to a compressor where it would be compressed adiabatically to a desired output pressure and then the water vapor is sent to a heat exchanger where it is made to condense and, in the process, return its latent heat of vaporization to the boiler. If saturated vapor is compressed adiabatically, it becomes super heated steam with a relatively high enthalpy. Given that the compressor work is equal to the enthalpy increase of the vapor between the input and output plus any dissipative effects, allowing the enthalpy to increase excessively during the compression process is disadvantageous from the perspective of energy usage.

Need for Compressor with Low Energy Loss:

A secondary source of poor thermodynamic efficiency in current prior art mechanical vapor recompression systems are dissipative effects in the compressor itself. Water vapor at atmospheric pressure occupies a large volume due to the small molecular mass of water molecules. The equivalent volume of 1 m³ (1000 kg) of liquid water once it has been converted to vapor at 1 atmosphere of pressure, at 100° C., is approximately 1674 cubic meters. As such, the compressor being used to recompress the vapor must process a tremendous volume of steam to generate one cubic meter of distilled liquid water. Most prior art mechanical vapor recompression systems use a roots blower type device, or radial continuous flow compressor.

For a roots blower, a medium sized device with a displacement of 20 litres (0.02 m³) could easily have internal friction resulting in a required torque in the range of 30 Nm to turn the device, even in the absence of a pressure differential. To process 1674 cubic meters of water vapor (equivalent to 1 cubic meter of liquid water at 373K, 1 atmosphere), the roots blower would need to perform. 1674 m³/0.02 m³/revolution=83700 revolutions. Given that energy can be express as:

$$E = T \times \theta \qquad \text{Eq. 1}$$

Where: E is energy expressed in Joules, T is the torque expressed in Newton meters, and θ is the angular rotation in radians The required energy to rotate the roots blower a sufficient number of cycles to process the corresponding volume of steam would be: 30 Nm×83700 revolution×2 pi rad/revolution=15.8 MJ, or 4.4 kWh's. As such, in this example nearly 4.4 kWh's are required to overcome the internal friction of the roots blower itself, without even considering the required work to compress the vapor.

For a typical compressor application where a relatively large pressure increase is imparted to the gas, the total energy requirement would be dominated by the PV work, the integral of the area under the curve of a PV diagram representing the compression process. For large pressure increase the PV work is large relative to dissipative effects mentioned above and as such the dissipative effects are usually deemed to be acceptable.

For an ideal compressor the process is generally assumed to be adiabatic. For Adiabatic compression the work done is:

$$W = h_{out} - h_{in} \qquad \text{Eq. 2}$$

Where $h_{out}$ is the enthalpy of the vapor at the output, and $h_{in}$ is the enthalpy of the vapor at the input of the compressor. For adiabatic compression the entropy of the gas is assumed to be constant at the input and output, as such the enthalpy of the compressed gas can be determined by following a constant entropy line from the initial condition to the higher pressure in well established empirically determined steam tables, from which the corresponding state of the compressed super heated gas can be determined including its enthalpy, as is generally known to those of ordinary skill in the art of thermodynamics.

The table in FIG. 7 summarizes the energy the compressor must supply to compress saturated water vapor, from 1 atmosphere, 99.97° C., by either 1 kPa, 5 kPa or 10 kPa. The required work is provided for two compression processes, the first process is novel and a differentiating feature of the current invention and assumes the vapor remains saturated as it is heated, while the second assumes the compression process occurs adiabatically, which is the case for standard compressors used in industry, including roots blowers, positive displacement compressors and continuous flow turbine based compressors as well as fans and blowers.

The starting condition of the vapor entering the compressor is shown in the second column. Saturated steam at 1 atmosphere absolute, is at a temperature of 99.97° C., has an enthalpy of 2.675 MJ/kg and an entropy of 7.355 kJ/kg ° C. If one increases the pressure to 2 atmospheres absolute in an adiabatic fashion, the temperature of the saturated steam becomes 166.79° C., the enthalpy increases to 2.803 MJ/kg while the entropy remains unchanged at 7.355 kJ/kg ° C. In this example, taking the amount of water vapor which corresponds to 1 cubic meter of liquid water (1000 kg), specifically the 1674 m³ at 1 atmosphere of water vapor, would require 1000 kg×(2.803 MJ/kg-2.675 MJ/kg)=128 MJ of energy, or approximately 35.56 kWHr. As we can see, even for a modest increase in pressure of 1 atmosphere, the PV work required to compress the gas, 35.56 kWhr, is much greater than the 4.4 kWh of energy lost to dissipative effects in the example above. Dissipative effects would correspond to slightly more than 10% loss which would generally be acceptable for a basic compressor. For a larger pressure increase of 2 atmospheres or even 3 atmospheres dissipative effects would become even smaller compared to the PV work which is being imparted to the gas.

In the current invention however, it is desirable to compress the water vapor by the minimum pressure amount needed to impart the required increase in condensation temperature, in order to minimize the amount of energy required to perform the recompression. Ideally, the pressure increase should be less than 10 kPa by preferably 5 kPa or lower. Essentially, it is desirable to use the lowest pressure possible to overcome the boiling temperature difference between the salt water/brine in the evaporator unit, and the pure water vapor in the condensation unit, while maintaining a slight temperature differential to allow a reasonable rate of heat transfer from the condensation unit back to the evaporation unit.

To highlight the point, the table in FIG. 7 provides the required PV work which must be imparted by the compressor onto the water vapor, for different output conditions. The starting condition is Saturated Vapor at 101.3 kPa and 99.97° C. The thermodynamic properties for water vapor at 1 atmosphere absolute is shown in column 2 of the table. Several output conditions are shown in columns 3-8. Assuming a 1 kPa pressure increase, if the compression occurs adiabatically, 0.461 kWh of energy is required while if the process proceeds along the saturated water line, only 0.119 kWh are required per 1000 kg of water. For higher pressure increases more energy is required. For a 5 kPa pressure increase, only 0.591 kWh of energy are required is the compression step occurs along the saturated water line, while 2.28 kWh are needed if the compression occurs adiabatically. The final rows show the energy requirement if a pressure increase of 10 kPa is imparted to the vapor, specifically 1.16 kWh if the compression occurs along the saturated water line, while 4.48 kWh of energy is needed if compression occurs adiabatically.

If one looks at the dissipative energy loss in the roots blower example provided above, the 4.4 kWr of energy loss due to internal friction from rotating a roots blower is very significant. For small pressure increases it is actually larger than the PV work needed to compress the vapor. For example, if the vapor is compressed from atmospheric pressure (101.3 kPa) to 106.3 kPa (an increase of 5 kPa) with concurrent heat transfer back to the evaporator chamber such that compression occurs along the saturated water line, only 0.591 kWh of energy is required, the dissipative losses of 4.4 kWh represent a 740% increase in the energy requirement.

Clearly, a compressor is needed with sufficiently small internal resistance/friction so as not to significantly impact the energy efficiency of the proposed mechanical vapor recompression system, or at a minimum, allow efficiencies which are slightly better than reverse osmosis systems. Given that reverse osmosis systems consume 5-7 kWh per cubic meter of desalinated water, and that increasing the pressure of 1000 kg of water vapor by 10 kPa, adiabatically requires 4.48 kWh, it would seems that at most, the compressor should dissipate 2.5 kWh of energy due to friction, viscous damping or other dissipative effects. This would imply that the compressor requires 4.48 kWh for actual thermodynamic PV work and 2.5 kWh to overcome dissipative effects, for a total of 7 kWh. This would allow the proposed mechanical vapor recompression system to achieve a comparable energy efficiency to a reverse osmosis system. Lower dissipative effects is desirable, but 2.5 kWh should be considered as the upper bound given the current performance achieved by reverse osmosis systems. As such, the proposed invention requires a means of compressing water vapor, with energy loss due to dissipative effects of less than 2.5 kWh when displacing 1000 kg of water vapor (1697 cubic meters), at atmospheric pressure. The author believes that a compression means capable of dissipating 1 kWh or even less than 0.5 kWh of energy due to friction, viscous damping and other dissipative effects is achievable, but 2.5 kWh is the maximum that would allow the proposed mechanical vapor recompression system to meet or exceed the energy efficiency of reverse osmosis systems if an adiabatic compression process is used.

The preferred embodiment of the currently proposed invention features a vapor recompression means which includes bellows 11 and 12 comprising a thin helical spring covered by a durable, waterproofed polymer fabric. The ideal fabric is waterproof, can withstand relatively elevated temperatures typical of saturated steam and can withstand flexing sufficiently to be used as a bellows for many years without cracking. Mylar is one such fabric given it is temperature resistant up to 400° C., completely waterproof and is extremely resistant to bending. If the mylar fabric is sufficiently thin and the spring is made from a wire with sufficiently small diameter to allow the spring to flex easily in the axial direction, while providing structural rigidity in the radial direction, a large bellows can be created which can be expanded and contracted with very little force and more importantly very little dissipated energy. Other polymers such as Kevlar could be used in the fabric to increase strength. Several thermoplastics would also make good choices, such as polyetherimide (PEI), Polyether ether ketone (PEEK), polytetrafluoroethylene (PTFE), polybenzimidazole (PBI), polydicyclopentadiene (pDCPD) to name a few. A great many combinations of polymers or even metals, glass fibers, carbon fibers or other compositions could be used to construct the bellows without departing from the spirit of the invention. The helical spring covered by the water and steam resistant fabric is used as a bellows 11, 12 in a positive displacement compressor 300. The large displacement volume combined with the relatively slow rate of revolution and very low pressure allows large volumes of vapor to be recompressed with very little energy loss. The top and bottom faces of the cylinder made by the spring, can be rigid surfaces mounted with pipes and valves to allow the inflow and outflow of vapor, as well as mechanical attachments to allow the bellows to be pressed up and down to compress the vapor or draw vapor into the bellows.

If one considers the dissipative losses of a bellows with relatively thin walls fabricated from a flexible polymer fabric attached to the helical spring, they are comparatively small. A metal spring will have relatively low dissipated energy as it is compressed and stretched. A mechanical spring generally has very high quality factors when it is set to vibrate which is indicative of very low damping (dissipative effects) within the spring itself. Furthermore, the thin polymer fabric will dissipate very little energy as it is folded to compress the bellows or unfolded to extend the bellows. For example, suppose a circular bellows made with 1.5 m diameter and a height of 1 meter, total internal volume of $(1.5/2)^2 * pi * 1.5) = 2.64$ m$^3$ is compressed by 0.566 m axially to have a new volume of 1.64 m$^3$, (1 cubic meter less) to result in a displaced volume of 1 cubic meter. If the fabric is reasonably thin, less than 100 N of force should be required (this does not include the force to compress the spring given that is not a dissipated energy and simply the act of storing energy within the spring momentarily). A 100N force over a distance of 0.566 m would require 56.6 Nm=56.6 J of work energy to be applied to the system. Given we have displaced 1 cubic meter of vapor, 1674 such displacements would be required to displace the volume corresponding to 1000 kg of water. As such, the dissipated energy in this example would be 56.6J*1674×2=189 kJ or 0.05 kWh. The bearings in the four-bar linkage and any bearing used to support the shaft would also need to be considered. For large roller bearings that are designed to support 10-20 kN of radial force, typical starting torque is on the order of 2 Nm, and running torque is lower, typically 1 Nm. For this large bellows, with a displacement of 1 cubic meter, and a diameter of 1.5 m, the axial force assuming 10 kPa gauge of pressure would be 17 kN. Due to the large displacement it only needs to rotate 1674 m$^3$/1 m$^3$ per revolution=1674 revolutions, and the energy dissipated per bearing would be on the order of 1 Nm×1674 rev×2 pi rad/rev=10.5 kJ or a very modest 0.003 kWh per bearing. As such, a large bellows compressor is ideal to displace large volumes of vapor, while dissipating very little energy due to friction and other effects. As such, a compressor means capable of displacing 1000 kg of water vapor, while dissipating less than 2.5 kWh of energy due to friction, pressure drop or other dissipative effects is achievable. One of ordinary skill in the art of mechanical engineering, specifically the design of compressors, would know how to design and implement such a compressor means without undue experimentation. The bellows compressor example provided above is one method. Other adaptations of diaphragm compressors, or adaptations of radial blowers or roots blowers specifically optimized to displace large volumes over low pressure could also be realized without departing from the spirit of the invention.

A second requirement of the invention is to have a very low thermal resistance between the condensation chamber 3 and evaporation chamber 2. The latent heat of vaporization of water is approximately 2.25 MJ/kg. In order to distill 1 m$^3$ of water, 1000 kg, approximately 2.25 GJ of heat must be transferred from the condensation chambers to the evaporation chambers. If one now refers to FIG. 8 which shows the condensation temperature of water vs. pressure, at 1 atmosphere the condensation temperature increases by about 0.27° C. per kPa of pressure. Since we desire to minimize the required mechanical work to compress the vapor, it is necessary to limit the operating pressure in the condensation chamber to a suitably low value. If we now refer to FIG. 7, we see that at a pressure 111.3 kPa. (10 kPa increase above 1 atmosphere), the required mechanical work is 4.48 kWh if compression occurs adiabatically but only 1.16 kWh if it occurs along the saturated vapor line. Furthermore, the table shows that the condensation temperature of saturated vapor at 111.3 kPA is approximately 102.63° C. Given that seawater boils at approximately 100.5° C. at 1 atmosphere, and the condensation temperature of the vapor in the condensation chamber is approximately 102.63 (if one compresses the vapor to 111.3 kPA), we have a temperature differential of (102.62° C.-100.5° C.)=2.12° C., with which to effect the heat transfer between the two chambers.

If we lump all heat transfer mechanisms, convection from the vapor in the condensation chamber to the heat transfer surface, conduction through the heat transfer surface, and convection from the heat transfer surface into the boiling liquid in the evaporation chamber, into a single thermal R-factor, we have the following equation:

$$\Delta T = \dot{Q} \times R \qquad \text{Eq. 3}$$

Where:
$\Delta T$=temperature difference between the vapor in the condensation chamber and boiling liquid in the evaporation chamber.
$\dot{Q}$: rate of heat transfer in J/s or Watts.
R: Thermal resistance from the vapor in the condensation chambers to the water in the evaporation chambers in ° C./Watt The second consideration is that the latent heat of vaporization for water, near atmospheric pressure, is approximately 2.25×10⁶ J/kg. As such, the amount of heat which must be transferred between the condensation and evaporation chambers can be expressed as:

$$\dot{Q} = \Delta H_{vap} \times \dot{m} \qquad \text{Eq. 4}$$

Where:
$\Delta H_{vap}$: Is the latent heat of vaporization of water, approximately 2.25×10⁶ J/kg
$\dot{m}$: Rate of distillation in kg/s.

Combining equations eq. 3 and eq. 4 we can arrive at a required maximum R-factor for the heat transfer between the condensation chambers and evaporation chambers:

$$R = \frac{\Delta T}{\Delta H_{vap} \times \dot{m}} \qquad \text{Eq. 5}$$

If we now use the temperature differential of 2.12° C. discussed previously, which is the temperature difference between saturated steam at 111.3 kPa and the boiling point of seawater at 1 atmosphere, and use the actual value for the latent heat of vaporation of water, 2.25×10⁶ J/kg, we have:

$$R = \frac{9.42 \times 10^{-7}}{\dot{m}} \qquad \text{Eq. 6}$$

Where:
R is the maximum thermal resistance between the vapor in the condensation chamber and water in the evaporation chamber in ° C./Watt
$\dot{m}$ is the mass rate of distilled water we desire to produce, in kg/s The equation shown in eq. 6 provides a maximum thermal resistance which will allow a distillation rate of $\dot{m}$ in kg/s, with a 2.12° C. temperature difference between the two chambers. The 2.12° C. was derived based on an operating pressure of 111.3 kPa in the condensation chamber and 101.3 kPa in the evaporation chamber, which is a 10 kPa difference.

Higher temperature differentials could be used while preserving an energy efficiency superior to that of reverse osmosis, if the system is designed to compress the vapor along the saturated vapor line. Referring to FIG. 6 one can see that at an output pressure of 125 kPa, adiabatic compression would require approximately 10 kWh of energy to 1000 kg of desalinated water, while the newly proposed compression process where the vapor remains a saturated vapor during the compression stroke would only require 2.6 kWh. At 125 kPa, the condensation temperature of water vapor is 105.97° C. The temperature differential relative to the boiling temperature of seawater is now approximately 5.5° C. As such, using the newly proposed compression process the maximum thermal resistance of the heat transfer means could be increased to:

$$R = \frac{2.44 \times 10^{-6}}{\dot{m}}$$

Need for Large Heat Transfer Surface:

In the proposed system, the thermally coupled evaporation 2 and condensation 3 chambers are two-phase systems with both vapor and liquid water. The saturated water vapor is collected from the evaporation chamber and brought to the condensation chamber where it is then compressed in the presence of a very low thermal resistive path to the evaporation chamber. The thermal coupling could be a thin copper plate which separates the boiling liquid in the evaporator chamber 2 from the saturated gas which is being compressed in the condensation chamber 3. Alternatively, a bundle of copper tubes could be used as is common in heat exchanger design. As the saturated vapor is compressed against the heat transfer plate 4 or surface there is a slight pressure increase. In turn, the condensation temperature increases and as such the vapor condenses against the heat transfer plate 4 so the latent heat of vaporization is returned back to the evaporation chamber. The pressure in the condensation chamber must be increased sufficiently that the condensation temperature of the saturated vapor be larger than that of the liquid being boiled in the evaporation chamber. If the thermal resistance between the two chambers is very low, the vapor can be liquified at the same rate that the volume is reduced, thereby preventing the pressure from increasing beyond a small incremental value, thereby ensuring that very little mechanical work is needed.

When the compression rate is slow enough to allow for adequate heat transfer between the two chambers, this process requires low energy input as it occurs nearly isothermally and isobarically given that compression occurs along the saturated vapor line. Furthermore, the vapor does not become a super heated vapor and as such a large enthalpy increase is avoided. For a 2 phase system of saturated vapor, if the process is performed quasi-statically, in principal vapor can be compressed into a liquid with little to no work. In practice, the compression cannot occur quasi-statically given the need to have a reasonable output of distillate, however, if the thermal conductivity between the condensation and evaporation chambers is very large compared to the compression rate, very small temperature and pressure increases become possible, which result in very low work. Therefore, a second element of innovation in the current patent application are the mechanical design which allows for a very large heat transfer surface between the two chambers. A larger heat transfer surface, results in higher thermal conductivity and lower R-factor, which results in a lower pressure and temperature increase and therefore lower energy costs, for a given output of distilled water or other compound.

BRIEF DESCRIPTION OF DRAWINGS

FIG. 1: Distillation system with one evaporation chamber

FIG. 2: Thermally Coupled Evaporation and Condensation Unit

FIG. 3: Prior Art Mechanical Vapor Recompression with Adiabatic Compressor

FIG. 4: Pressure vs. Volume and Temperature vs. Entropy Diagrams for a Mechanical Vapor Recompression System with Adiabatic Compression.

FIG. 5: Pressure vs. Volume and Temperature vs. Entropy Diagrams for a Mechanical Vapor Recompression System with Heat Transfer back to the Evaporator during Compression FIG. 6: Graphs showing the increase in enthalpy, of water vapor, when it is compressed adiabatically or along the saturated water line.

FIG. 7: Table showing Energy Requirement to Compress Water Vapor with different end states.

FIG. 8: Saturation Temperature vs. Pressure for Pure Water

FIG. 9: Pressure and Temperature increase during compression, for different rates.

FIG. 10: Graph showing quantity of liquified vapor as a function of compression as well as the rate of heat transfer between the two chambers as a function of compression rate.

FIG. 11: Distillation System with Multiple Evaporation/Condensation chambers in parallel with a single compressor where bellows 11 is expanding and bellows 12 is compressing.

FIG. 12: Distillation System with Multiple Evaporation/Condensation chambers in parallel with a single compressor where bellows 12 is expanding and bellows 11 is compressing.

FIG. 13: Interleaved Thermally Coupled Evaporation/Condensation Chamber

FIG. 14: Low Differential Pressure Distillation System Housed within a Thermally Insulated Structure FIG. 15: Energy Efficiency of Novel Vapor Recompression System vs. Current State of the Art Systems such as Reverse Osmosis, Multistage Flash Desalination and Reverse Osmosis.

DETAILED DESCRIPTION OF PREFERRED EMBODIMENT

The preferred embodiment of the high efficiency distillation system uses a very small differential pressure cross the condensation unit and evaporation unit, to increase the condensation temperature in the condensation unit relative to the evaporation temperature in the evaporation chamber. The thermally coupled evaporation and condensation unit 100 can be found in FIG. 1 and FIG. 2. The top chamber is the evaporation chamber 2 which would include salt water in the case of a desalination system, but it could also be used to distill another solution. At the top of the evaporation chamber 2 the vapor can enter a duct 6 which leads the vapor to a compressor 300 which includes chambers 11 or 12 as well as valves to direct flow and a means for driving the compressor 400. Means for driving the compressor 400 could comprise of an electrical motor and some form of 4 bar linkage 402 potentially with sliders, to convert the rotational motion of the motor into an oscillatory motion as is generally known in the art of mechanical design. To reduce dissipated energy ball bearings, roller bearings and rollers would preferentially be used to create the linkage 402. For a small unit where the volume in the evaporation chamber is not large enough to accommodate a sizeable quantity of vapor without inducing a pressure increase, there are two compression chambers, 11 and 12, which operate in opposite phase. As one unit compresses the vapor, the condensation point of the vapor increases slightly, and the vapor begins to condense in the condensation chamber 3 on the bottom of the heat transfer plate 4. This transfers the latent heat of vaporization back to the evaporation chamber 2, causing a comparable amount of water to evaporate in evaporation chamber 2. Mean while, the other chamber is expanding and drawing in the vapor as it is produced in the evaporation chamber. This keeps the pressure in the Evaporation Chamber relatively constant. In addition, the drawing shows low pressure drop/low resistance valves 200, 201, 202 and 203 which open during the appropriate phase of the cycle on each of the compressor bellows 11 and 12. The valves are preferable electronically or mechanically controlled to open and close in the appropriate portion of the cycle, or could be check valves with a very low pressure drop. When the left chamber 11 is expanding, valved 201 opens to allow vapor from the evaporation chamber to be drawn into the expanding bellows 11. Similarly, when bellow 12 is contracting, valves 202 opens to allow the compressor to push vapor into the condensation chamber 3. Valves 201 and 202 can be actuated simply by the pressure difference of the flowing vapor, or can be electronically or mechanically controlled. Electronic or mechanical control is preferred since this will allow the valves to be opened at such a time to improve the overall thermodynamic efficiency. The right had side of the diagram shows the state of the valves in the opposite phase of the cycle, when bellows 11 is contracting and bellows 12 is expanding. During this phase of the cycle, valve 200 is open to allow the vapor from compressing bellows 11 to flow towards the condensation chamber 3. Similarly, valve 203 is open to allow vapor to flow from the evaporation chamber 2 to the now expanding bellows 12. Valves 200 and 203 can be actuated simply by the pressure difference of the flowing vapor, or can be electronically or mechanically controlled.

One of the keys to achieving good energy efficiency, is the thermal conductivity of the heat transfer plate 4. The thermal conductivity must be high enough to transfer the heat of vaporization back to the evaporation chamber. If the thermal conductivity is not adequate, the vapor will not be liquified fast enough, and a larger pressure differential will develop across the evaporation and condensation chambers as the compressor operates, causing additional mechanical work to be required and reducing energy efficiency. The thermal conductivity of the heat transfer plate should be good enough to transfer the latent heat of vaporization from the condensation chamber to the evaporation chamber with a small temperature differential, ideally less than 2° C. to achieve excellent energy efficiency. The need to have excellent thermal conductivity, low thermal resistance, between the vapor in the condensation chambers and saturated water in the evaporation chambers was described in Eq. 5 and Eq. 6 earlier. For the parametric analysis later in the document, the energy efficiency is bench marked for a design with a thermal resistance of 2.5° C./Megawatt. A dominant source of thermal resistance is the coefficient of convection from the vapor, to the plate, in the condensation chamber. The coefficient of convection can range from about 500 kW/° $Cm^2$ for drop wise condensation, to about 5 kW/° C. $m^2$ for film condensation. Coatings can be applied to the bottom surface of the heat transfer plate to promote dropwise condensation thereby achieving higher coefficients of convection as is known in the art.

FIG. 2 shows the thermally coupled evaporator and condensation unit 100 in more detail. A low cost implementation of this unit could be constructed from a top clam shell 21 and a bottom clam shell 20. The clam shell could be constructed of a temperature resistant thermoplastic or other suitable polymer which is nearly completely resistant to corrosion and can withstand the 100° C. environment typical of boiling water and vapor. Furthermore, a thermoplastic/polymer clam shell could be manufactured using extrusion molding techniques and as such could be manufactured for a very low cost. The two clam shells, top clams shell 21 and bottom clam shell 20 are sandwiched together to hold heat transfer plate 4. Bolts or some other mechanism could be used to firmly hold the two half clamshells together as are generally known in the art of mechanical design. Gaskets or sealing can be applied between the heat transfer plate 4 and the two half clams shells 20 and 21 to prevent leakage of brine, water or vapor. The relatively low differential pressures in the range of a few kPa would result in a relatively small force even on a fairly large unit with an area of over 1 square meter, which is compatible with most thermoplastic materials. In addition, a means for inserting salt water 7, a means for removing the concentrated brine 8, and for removing the distilled water 9 are also provided. The tubing and valve systems to insert salt water 7, removing concentrate brine 8 and distilled water 9 could take many forms as is generally known in the art without deviating from the inventive spirit of the invention. The heat transfer plate 4 could be a flat or folded/corrugated to increase the surface area between the plate and saturated vapor in the condensation chamber, thereby reducing the thermal resistance between the two chambers. The heat transfer plate can be fabricated from a high thermal conductivity metal such as copper, aluminum or another alloy which offers good thermal conductivity and acceptable corrosion resistance.

FIG. 3 depicts a Prior Art Mechanical Vapor Compression system. The salient features of prior art mechanical vapor recompression systems are the adiabatic compressor 22, which increases the pressure of the vapor adiabatically, generating the super heated steam 23 which exits the compressor and enters the condensation tubes 24. The brine is sprayed from the top of the unit onto the hot condensation tubes 24, to induce evaporation. This particular unit has a pump 30 to recirculate a portion of the unevaporated brine. A portion of the brine recirculated by the pump is sent to the heat exchanger 27 and then exits the system. The heat exchanger 27 transfers the heat from the fresh water and brine exiting the system, both near the operating temperature of the unit, to the incoming sea water.

In thermodynamics, compressors are generally assumed to be adiabatic. This is primarily due to the fact that the vapor remains in the compressor for a very short time, and the amount of heat transfer which may occur is generally very small compared to the overall mechanical work imparted on the vapor/gas. The adiabatic compression is problematic because it requires considerably more mechanical work given that the vapor is compressed into a super heated vapor, with relatively high enthalpy, which translates to more mechanical work and hence electrical power.

The thermodynamic cycle for a Prior Art Mechanical Vapor Compression system is shown on a Pressure Volume diagram in FIG. 4. The diagram shows both a Pressure vs. Volume (PV) and Temperature vs. Entropy (TS) diagram. For the sake of comparison, FIG. 5 shows a similar PV and TS diagram for the newly proposed Mechanical Vapor Compression System with thermal coupling between the compression chamber and evaporation chambers. On a PV Diagram, the area enclosed by the Process curve is the Mechanical Work which must be supplied by the Compressor and electric motor, while on a Ts diagram, the area enclosed by the process represents the excess heat which is generated by the process. Point 31, is the entrance of cool sea water. Between Point 31 and Point 32 would be a heat exchanger to heat the incoming sea water to the operating temperature of the evaporation chamber. On the PV diagram the migration from Point 31 to Point 32 occurs at constant pressure while on the Ts diagram one can clearly see an increase in temperature. To achieve the heating, the exiting distilled water flow and the exiting used brine would be used as heat sources. Point 32 is the sea water after it has been heated to the evaporator temperature, if we are operating at atmospheric pressure, it is around 100° C. The system need not operate at atmospheric pressure. It is often desirable to operate around 70° C. to reduce the accumulation of Calcium Sulfate scale on the heat exchange surfaces and as such a lower operating pressure may be desirable. Point 32 to point 33 is the evaporation process which occurs in the evaporation chamber 20 or 2. The latent heat of vaporization needs to be added to the water to cause the liquid to evaporate. The latent heat of evaporation is very significant, for water this represents about 2.25 MJ per kilogram at pressures close to atmospheric pressure. Given that the liquid and vapor are both in the same evaporation chamber (2 phase system), the evaporation step occurs at both constant pressure and constant temperature, at a given instant in time. Over time, the pressure can vary if more or less vapor accumulates in the chamber. The evaporator is essentially a 2 phase system and must be at a Pressure and Temperature where the compound being distilled can exist as both a liquid and vapor. The areas enclosed within the Saturated Liquid Line and Saturated Vapor line on both the PV and Ts diagrams shown, correspond to states where water may exist in either of the two phases, liquid or gas.

The compression steps are where the two processes differ. For a prior art mechanical vapor recompression system, the compressor takes saturated vapor at 33, and given the compression follows an adiabatic path, produces super heated steam at point 34. The line between points 33 and points 34 in FIG. 4 follow a constant entropy or isentropic path. The amount of mechanical work which must be supplied by the compressor equates to the increase in enthalpy between position 33 and 34, which can be very substantial. On a Ts diagram, an adiabatic process is depicted by a vertical line, with constant entropy. On a Pv diagram, constant entropy compression follows a curved trajectory which moves from the saturated vapor line into the super heated steam region. The super heated steam has a relatively high enthalpy and also incurs a substantial temperature increased compared to saturated steam at the same pressure.

In the newly proposed mechanical vapor compression system with thermal coupling between the compression 3 and evaporation 2 chambers, the heat transfer plate 4 ensures the vapor remains a 2 phase, saturated vapor and liquid system, while it is being compressed. As the vapor beings to be compressed, the condensation temperature increases. FIG. 5 depicts the condensation/evaporation temperature of water as a function of pressure. Near atmospheric pressure, the boiling point of water increases by approximately 0.27° C. per kPa of increased pressure. As such, assuming the system is operating at atmospheric pressure and the evaporation chamber is at 100° C., as the pressure in the compression chamber is increased by 1 kPa above atmospheric pressure, the condensation temperature in the evaporation chamber will increase by about 0.27° C. compared to that of the evaporation chamber. Given that the heat transfer plate has excellent thermal conductivity, it is being maintained at or very near the operating temperature of the evaporator. The result is that the vapor will begin to condense on the heat transfer plate. Both the evaporator and condensing chambers are 2 phase systems. In the evaporator chamber, liquid water is sitting on the heat transfer plate while the space above the liquid is saturated vapor. Similarly, in the compression chamber, condensation of the vapor on the heat transfer plate produces water droplets which may fall into the bottom of the chamber, while the majority of the volume is occupied by saturated water vapor. Given the condensation chamber is a 2 phase system, for a given pressure within the chamber, the mixed vapor/liquid system must be at a specific temperature. If the volume of the compression chamber were held steady, the vapor would continue to condense until such point that the pressure in the chamber has dropped to a level where condensation ceases. However, if the volume is gradually decreased to maintain the internal pressure at a level where the condensation temperature of the vapor is higher than the internal temperature of the evaporator unit, condensation will continue. If the compression occurs slowly relative to the rate at which liquification of the vapor can occur, the amount of work needed to compress the vapor and recover the latent heat of vaporization can be very minimal. In the limit, quasistatic compression of a 2 phase liquid/vapor system can occur with no work, if the process occurs both isothermally and isobarically. In FIG. 5, the compression phase starts at point 33, point 38 shows the points where some vapor begins to be liquified. Liquification would commence almost immediately, as soon as the condensation temperature in the condensation unit 3 exceeds the temperature of the heat transfer plate 4. Movement of the curve off of the saturated vapor line indicates that a small portion of the vapor has been converted to liquid. Finally at point 39, we achieve a constant pressure. Constant pressure is achieved when the rate of compression matches the rate at which vapor can be liquified. A lower the thermal resistance between the two chambers, will result in a smaller pressure increase between the two chambers, for a given distillation rate. Unlike adiabatic compression which results in super heated steam with a very high enthalpy and a substantial temperature increase above that of saturated vapor at the same pressure, in this case, there is no sharp increase in enthalpy or temperature. The pressure is simply increased until the rate of liquification matches the rate of compression. From point 39 to point 36, the vapor is condensing in condensation chamber 3 and transferring its heat of vaporization back to the water in the evaporator chamber 2. From point 36 to point 37, the distilled liquid is exiting the system through the heat exchanger 501 of FIG. 14, and transferring its thermal energy to the incoming sea water. One of the keys to having the leading edge of the compression cycle move along the saturated vapor line is to have the valves 200 or 202 open at the beginning of the compression stroke, such that the vapor in the bellows and condensation chamber 3 form a single control volume. As the bellows moves forward to begin compressing the gas, a pressure increase occurs concurrently in the condensation chamber.

For a compressor the work performed by the compressor can be calculated as:

$$q + w = h_2 - h_1 + \frac{V_2^2 - V_1^2}{2} \qquad \text{Eq. 7}$$

Where:
q: is the heat transfer into the system (positive) or out of the system (negative)
w: is the work done on the system, by the compressor
$h_2$: is the enthalpy of the vapor as it exits the compressor
$h_1$: is the enthalpy of the vapor as it enters the compressor
$V_2$: is the velocity of the vapor at the exit of the compressor
$V_1$: is the velocity of the vapor as it enters the compressor.

For adiabatic compression, q is assumed to be zero. In a real compressor the heat transfer can never be completely eliminated, but it is generally small compared to the mechanical work imparted on the vapor and can be approximated as adiabatic. In addition, for most compression processes the kinetic energy of the gas at the entrance and exit is generally small compared to the enthalpy increase of the vapor. As such, for most adiabatic compressors, equation 1 can be simplified as:

$$w = h_2 - h_1 \qquad \text{Eq. 8}$$

As such, ensuring that the enthalpy increase is kept to a minimum is beneficial in keeping the work which needs to be supplied by the compressor to a minimum. Compressor work roughly equates to the electrical power which needs to be drawn from the power grid, with an additional 5% to 10% adder to account for the efficiency of the electric motor and compressor efficiency plus any additional losses due to internal friction due to bearings, part to part sliding contact, pressure drop as gas moves through valves or lines and other sources of dissipative loss.

FIG. 6 shows the increase in enthalpy of water vapor, when it is compressed along 2 paths. The top line is when the vapor is compressed adiabatically, using a conventional compressor. This line would be typical of the enthalpy increase incurred by a prior art mechanical vapor recompression system if the vapor enters at atmospheric pressure and exits the compressor at the pressure shown on the x-axis of the graph. The bottom line is the enthalpy increase if one compresses the water vapor along the saturated water line. This particular graph assumes that the starting pressure is atmospheric pressure, at 101.3 kPa and the recompression pressure is the final pressure at which condensation occurs. The enthalpy increase when compressing along the saturated water line, is about 26% of the enthalpy increase which results when compressing adiabatically, to the same pressure. This ratio is fairly constant in the range of 101.3 to 129 kPa. As such, the newly proposed mechanical vapor recompression system can potentially reduce the mechanical work to an amount which is approximately ¼ that of a prior art system for a comparable condensation pressure and hence system output.

If we now apply Eq. 7 above to the currently proposed mechanical vapor recompression, we have:

$$q + w = (xh_{2gas} + (1-x)h_{2liq}) - h_{1gas} + \frac{V_2^2 - V_1^2}{2} \qquad \text{Eq. 9}$$

Where:
q: Is the heat transfer back from the condensation chamber to the evaporation chamber
w: work required to be done by the compressor
x: Quality factor of the saturated vapor/liquid mixture at the end of the compression stroke, where x is the fraction of vapor and (1−x) is the mass fraction of liquid.
$h_{2gas}$: is the enthalpy of the water vapor at pressure 2.
$h_{2liq}$: is the enthalpy of the liquid water at pressure 2.
$v_2$ and $v_1$: the output and input velocity of the vapor, which can be neglected for a bellows compressor.

Furthermore, given that the heat transfer out of the compression chamber is essentially the latent heat of vaporization times the mass of vapor which has been liquified we have:

$$q = -(1-x)h_{vap} \qquad \text{Eq. 10}$$

where hvap is the enthalpy of vaporization and the (1−x) is the fraction of the water vapor mass which has been liquified. The negative is due to the fact that this heat has left the system (condensation chamber+bellows) given it has been transferred to the evaporation chamber.

Substituting the expression for q in Eq. 10 back into Eq. 9 we have:

$$-(1-x)h_{vap} + w = (xh_{2gas} + (1-x)h_{2liq}) - h_{1gas} + \frac{V_2^2 - V_1^2}{2} \qquad \text{Eq. 11}$$

Realizing the $h_{2gas} = h_{vap} + h_{2liq}$ and moving the −(1−x)$h_{vap}$ term to the right side of the equation we have:

$$w = (xh_{2gas} + (1-x)(h_{2vap} + h_{2liq})) - h_{1gas} + \frac{V_2^2 - V_1^2}{2} \qquad \text{Eq. 12}$$

Combining $h_{2vap} + h_{2liq}$ into $h_{2gas}$, and neglecting the kinetic energy term we have:

$$w = (xh_{2gas} + (1-x)(h_{2gas})) - h_{1gas} \qquad \text{Eq. 13}$$

Combining x+(1−x)=1, we arrive at:

$$W = h_{2gas} - h_{1gas} \qquad \text{Eq. 14}$$

Eq. 14 is essentially identical to the simplified equation for adiabatic compression, with one major exception. In this case, $h_{2gas}$ is the enthalpy of the water vapor at its saturation temperature, as opposed to the super heated temperature when it is compressed adiabatically.

FIG. 6 shows the calculate work for the adiabatic compression and compressing along the saturated vapor line. FIG. 7 shows some calculated values of required compressor work for different end state, assuming a starting condition of saturated vapor, at 1 atmosphere (101.3 kPa), 99.97° C. (boiling temperature of water at 1 atmosphere of pressure). Required compressor work are shown for adiabatic compression as well as when the vapor is compressed along the saturated vapor line.

The boiling point elevation coefficient for sodium chloride dissolved in water is 1.02° C./molal of salt. Sea water generally has about a 3% salt content by mass. As such, for 1 kg of water there is approximately 30 g of dissolved salt. The molar mass of NaCl is 58.44 g, from which we can conclude that the molality of salt in sea water is approximately 0.5 m.

The boiling point elevation can be calculated as:

$$\Delta T_b = K_b m \qquad \text{Eq. 15}$$

Where:
$K_b$ is the molal boiling point constant, which is approximately 1.02° C./molal for NaCl.
m is the molality of NaCl in the solution.

Therefore, we calculate the boiling point temperature increase for sea water to be approximately 0.5° C. As such, the compressor would need to increase the pressure in the condensation unit sufficiently to overcome the boiling point temperature increase due to salt content, of about 0.5 degrees.

FIG. 8 shows how the boiling point of water changes with pressure. Near atmospheric pressure the boiling/condensation point of water varies by about 0.27° C./kPa of ambient pressure. Given that the evaporation chamber has salt water while the condensation chamber has pure water, additional pressure is required in the condensation chamber relative to the evaporation chamber to overcome the boiling point elevation due to salt content. At least 2 kPa are required for pure seawater, potentially 3-4 kPa if the brine is more concentrated.

There are several considerations when deciding the operating temperature and pressure of the system. Operating near atmospheric pressure allows very low cost mechanical devices to be used. For example, the distillation units can be housed in a relatively low cost structure with thermal insulation, but without the need to withstand a large pressure differential. Conversely, a system designed to operate at 65° C. would require a pressure of 25 kPa absolute, but requires less insulation. Due to the low pressure, the bellows based compressors and distillation/condensation units would need to be housed in a compartment which can maintain a low pressure, to avoid a pressure differential across the bellows, or else the individual units would need to be constructed to withstand a large pressure differential. However, operating at lower temperature reduces scaling due to the buildup of calcium sulfate on evaporative surfaces. Operating near atmospheric pressure would minimize capital cost but may require slightly higher operating cost.

The parametric analysis of the currently proposed mechanical vapor recompression system can be seen in FIG. 9 and FIG. 10. FIG. 9 shows the Pressure and Temperature, as a function of bellows displacement, for different compression rates. In this analysis the bellows is assume to have an initial volume of 1 m³, and to compress to a final volume of 0.2 m³, for a total change in volume of 0.8 m³. The thermal conductivity between the vapor in the condensation chamber and the saturated water in the evaporation chamber is calculated to be 400,000 W/° C., or alternatively, the thermal resistance is $2.5 \times 10^{-6}$° C./W. The graphs show the pressure and temperature increase for different stroke rates; 10 seconds, 5 seconds, 2 seconds, 1 second and 0.5 seconds. For very fast compression rates, there is a significant pressure and temperature increase. This is caused by the finite thermal conductivity between the condensation and evaporation chambers, and the need to have a larger temperature differential between the two chambers to conduct the latent heat of vaporization across the heat transfer plate. For slower compression rates the pressure and temperature increase become less important, and the resultant mechanical work needed to compress and liquify the vapor is decreased. At the slowest rate, 1 stroke per 10 seconds, the required energy is only 0.72 kJ per stroke. For the parametric analysis, the system is initially designed to have a volume of 1 cubic meter when the bellows is fully withdrawn, and a volume of 0.2 cubic meters when the bellows 11 or 12 is fully compressed. The radial cross section of the bellows is 1 square meter, as such, the volume decrease in cubic meters is equal to the bellows displacement shown on the x-axis of the graphs.

The increase in temperature and pressure is therefore proportional to the rate of compression, and to the thermal resistance between the condensation and evaporation chambers. Improved efficiencies can be obtained by reducing the compression rate, or reducing the thermal resistance between chambers. The primary method of reducing the thermal resistance is to increase the surface area at the condensing interface in the evaporation chamber. Maximizing convective heat transfer between the vapor and heat transfer surface is also critical. In an environment where saturated vapor is in contact with a surface which is cooler than the condensation temperature, the coefficient of convection between the saturated vapor and the cool surface can be very large. There are two general modes of condensation, film condensation and dropwise condensation. Film condensation generally refers to a system where the condensing vapor forms a film over the cool surface, while dropwise is when the condensing vapor forms small distinct droplets on the cool surface. The coefficient of convection for condensing water vapor in a film condensation environment is generally in the range of 5000 W/m$^2$K while it is much larger, approximately 500 kW/m$^2$K for dropwise condensation. Ensuring Dropwise condensation by applying a very thin hydrophobic coating on the heat transfer surface within the condensation chamber is therefore beneficial to minimizing thermal resistance.

FIG. 10 shows the rate at which vapor is liquified, as well as the rate of heat transfer between the two chambers. For the slower rates, the heat of vaporization can be readily transferred back to the evaporator, as the vapor is compressed. For the faster rates, the required heat transfer to condense ~450 g of water vapor in 0.5 seconds is about 2250 kW which requires a larger temperature differential across the heat transfer surface 4 separating the condensation 3 and evaporation 2 chambers, and as a result higher pressures in the compression chamber.

From FIG. 9 and FIG. 10 it should be apparent that maximum energy efficiency can be achieved by increasing the surface area of heat transfer plate 4 between the evaporation 3 and condensation 2 chambers, for a given distillation rate. A larger surface area decreases the thermal resistance between the two chambers and as a result a smaller temperature difference is required to transfer the latent heat of vaporization back from the condensation 3 to the evaporation 2 chambers. One method of increasing the overall surface area is to include many units in parallel as shown in FIG. 11.

FIG. 11 shows an arrangement where a multitude of thermally coupled evaporation and condensation chambers 100, 101 and 102 are attached in parallel to a single compressor 300. Although the particular diagram shows 3 thermally coupled evaporation and condensation chambers 100, 101 and 102 connected in parallel to a single compressor 300, it should be understood that the number of units could vary, and could be any integer number of units that provides a favorable heat transfer capacity for a given compressor capacity. This particular diagram shows the flow of vapor when the bellows on the left 11 is expanding and drawing in vapor from the evaporation chambers 2 of the multiple units, through valve 201, while contracting bellows 12 is compressing the vapor and pushing it through valve 202 to the multitude of condensation chambers 3. It should be understood that in the opposite phase of the cycle, bellows 11 will be contracting and bellows 12 expanding, and the flow of vapor would be reversed, in a similar manner to that shown in FIG. 1, on the right hand side of the drawing. The benefit of having multiple thermally coupled evaporation/condensation units 100, 101 and 102 attached in parallel to a single compressor 300 are several. The first benefit is that a single larger compressor will be more efficient and cost effective and will require less maintenance than many small compressors. The second benefit is that a larger heat transfer surface area will allow lower differential pressures to be used for a given distillation rate, hence using multiple units 100, 101 and 102 is beneficial. The third benefit is that to be cost effective, small thermally coupled evaporation/evaporation units are favorable. Smaller units can withstand the differential pressure more easily and can use thinner walls for the top and bottom clam shells, and the heat transfer plate can be thinner given the total force applied to the plate is proportional to its area. Not shown in the diagram are couplings and valves to allow individual evaporation/condensation units to be removed or replaced for maintenance. Although not shown in the drawing it should be understood that the seawater intake 7, brine exit 8 and distilled water exit 9 would be connected to an assortment of pipes, pumps as well as heat exchangers to pre or post treat the incoming or outgoing flows of liquid to the distillation unit.

FIG. 12 is similar to FIG. 11, with the exception that it shows the vapor flow in the opposite phase of the cycle. In FIG. 12 bellows 11 is contracting while bellows 12 is expanding. Saturated vapor is being compressed into the condensation chambers by bellows 11. Valve 200 is open to allow the flow of vapor from compressing bellows 11 to the evaporation chambers through duct 5. Concurrently, bellows 12 is expanding and valve 203 is open to allow saturated vapor to flow from the evaporation chambers into bellows 12.

In order to increase the overall area of the heat transfer surface between the evaporation chamber 2 and condensation chambers 3, an alternative to using many individual thermally coupled evaporation and condensation units 100, could be to use an interleaved design 110 as shown in FIG. 13. FIG. 13 shows multiple interleaved evaporation chambers 21, 22, 23, 24. With multiple condensation chambers 31, 32, 33 and 34. Although 4 units are shown here, it should be understood that any number of units could be interleaved. Each evaporation and condensation chamber are separated by a heat transfer plate 4, such that the liquid brine in the evaporation chamber is sitting on the top surface of the heat transfer plate 4, while the saturated water vapor in the condensation chambers 31, 32, 33 and 34 is in contact with the bottom of the heat transfer plates 4. Given that each condensation chamber 31, 32, 33 and 34 are compressed to a slightly higher pressure than the corresponding evaporation chambers, 22, 23, 24 and 25, vapor condenses on the bottom of the heat transfer plates 4, thereby returning the latent heat of vaporization to the brine. Duct 5 carries compressed vapor from the compressor to each of the condensation chambers while duct 6 carries saturated vapor away from each evaporation chamber and brings it to the compressor. Separation plates 41 are present to separate the bottom of the condensation chambers from the top of the evaporation chambers. These surfaces are not primary heat transfer paths given that the liquified distilled water is stilling on the top of the separation plate 41, and there is no need to transfer heat into the top of evaporation chamber 23, 24 and 25 given that surface is in contact with water vapor which is already in the gas phase. As such, separation plates 41 need not be made from high thermal conductivity material and could be made from a lower cost polymer or thermoplastic similar to the outer walls of clamshells 21 and 20.

For an Interleaved thermally coupled condensation and evaporation module 110, the salt water inlet 7, includes a means of delivering sea water to each of the evaporation chambers such as a drip tube. Similarly, means for removing concentrated brine 8, would include a collection tube in each of the evaporation chambers. Means for removing distilled water 9 would similarly include a collection tube with an input near the bottom of each Condensation chamber. In the diagram, a feed tube or drip tube is shown going to each of the chambers to deliver or collect the required fluid.

The primary benefit of using interleaved thermally coupled condensation and evaporation module 110, as opposed to multiple individual thermally coupled condensation and evaporation modules 100, is that a great heat transfer plate surface area can be achieved in a given volume. For example, in a given distillation plan a larger capacity could be designed into a given thermally insulated enclosure. Also, an interleaved design should offer a lower cost per unit area of heat transfer plate making an interleaved design more cost effective.

FIG. 14 depicts a low differential pressure distillation system placed in an insulated structure 500. The insulated structure 500 could vary in size from a relatively small structure which can be fit onto a trailer which is towed by a truck, to very large structure such as large wear house like building measuring over 100 meters to a side which distills sufficient water to supply a small city. The larger the structure 500, and the more distillation systems it houses, the more excess heat will be generated relative to the thermal heat which is lost to the external environment.

Within insulated structure 500, there is one or more compressor units 300 as well as one or more interleaved thermally coupled evaporation and condensation units 110. The salt water inlet 7, brine exit 8 and distilled water exit 9, pass through a heat exchanger 501 as they enter or exit the thermally controlled structure. The exiting brine 8 and exiting distilled water 9 are approximately at the internal operating temperature of the distillation system, while the salt water inlet 7 brings in cool sea water which would be at a lower temperature. The cross-flow heat exchanger 501 transfers the heat of the exiting fluids to the incoming seawater.

In this embodiment, the means for driving the compressor 400 is assumed to be an electrical motor. Although not strictly necessary, the electrical motor 400 is placed outside of the high temperature insulated structure 500 to ensure good efficiency and long life. The winding on most electrical motors will age faster if continuously exposed to elevated temperatures, as such it is beneficial to keep the motor external. A shaft is use to transfer the power from the motor 400 to the compressor 300. Not shown in the diagram would be several bearings such as roller or ball bearings to support the shaft while allowing it to rotate freely. The shaft would be used to power linkage 402. Linkage 402 could be a 4-bar linkage and may potentially include sliders or rollers as is generally known in the art of mechanical engineer design when translating power from a rotating motor to a reciprocating device. The purpose of linkage 402 is to convert the rotating motion of shaft 401 into a reciprocating or alternating motion to drive bellows 11 and 12. The attachment from the linkage 402 to the top of each bellows 11 and 12 is not shown for simplicity of the drawing. The compressor 300 is used to draw vapor from the evaporation chambers 22, 23, 24 and 25, and to compress vapor into condensation chambers 31, 32, 33 and 34 in order to perform the distillation, as previously described. Duct 5 carries vapor to all compression chambers while duct 6 carries vapor away from all evaporation chambers. The operation of valves 200, 201, 202 and 203 is similar to that previously described. The valves can be mechanically or preferably electrically controlled, or could be simple check valves specifically designed to have a very low pressure droop. Mechanical and Electrical control is preferred since this will allow the valves to open at precise times in the cycle to optimize thermodynamic efficiency and minimize the mechanical work which needs to be supplied by the compressor.

The insulated structure 500 can include a multitude of compressors 300, electrical motors 400 and thermally coupled evaporation and distillation units 1 and 110 systems. The inventor believes that maximum cost efficiency could be achieved by having one large insulated structure hold a multitude of evaporation units. Given the system aims to use a minimum pressure differential necessary to perform the distillation, the excess heat per cubic meter of distilled water is relatively small. The excess heat can be in the range of 1 kWh per $m^3$ of distilled water. As such, to prevent the need to heat the incoming water, it is desirable to place a larger quantity of units within a single insulated structure, such that the excess heat from the process be sufficient to keep the internal temperature of the structure at the desired operating temperature of the evaporator units. Furthermore, a radiator 502 can be incorporated after the saltwater inlet 7 has flowed through the heat exchanger 501. Given that a heat exchanger 501 will not necessarily bring the incoming seawater all the way to the desired temperature, if the air temperature within the thermally insulated structure 500 is higher than the salt water inlet temperature after passing through the heat exchanger 501, it can be beneficial to heat it using radiator 502 prior to inserting the salt water into evaporation chambers 22, 23, 24 and 25.

FIG. 15 provides a summary of the thermodynamic efficiency of the newly proposed system versus current state of the art seawater desalination systems. Performance was baselined for a system with a bellows which compresses vapor from a volume of 1 $m^3$ down to 0.2 $m^3$, at various stroke rates of 10, 5, 2, 1 and 0.5 seconds per stroke. The energy requirements per stroke, as well as per 1 $m^3$ of desalinated water are shown in the table. Furthermore, the thermodynamic efficiencies are shown in a bar graph compared to reverse osmosis, current mechanical vapor recompression systems which use adiabatic compressors and multistate flash desalination systems. At slower desalination rates of 4 $m^3$/day for heat transfer capacity of 400×$10^3$ W/K or R=2.5×$10^{-6\circ}$ C./W, the thermodynamic efficiency is 16× more efficient that published values for Reverse Osmosis.

Need for Fast Relaxation Time Relative to Stroke Interval:

During experimentation the author notice that for the currently proposed system which compresses the vapor along the saturated water line, it is necessary that the relaxation time of the compression chamber, be fast relative to the stroke interval. For example, the compression chamber is thermally coupled with the evaporation chamber. Once the bellows 11 or 12 have completed the compression stroke, there will be a short interval prior to the commencement of the next compression stroke. In order to achieve excellent thermodynamic efficiency and ensure that the next compression stroke also compresses the vapor along the saturated water line, it is necessary that the pressure within the condensation chamber drop during the internval between the end of the immediate compression stroke, and the beginning of the next compression stroke.

The relaxation time will increase as the total mass of compressed vapor increases and as the thermal resistance between the compression chamber and evaporation chamber increases.

The total energy stored as latent heat of vaporization in the condensation chamber 3 and duct 5 can be expressed as:

$$Q = V \cdot \rho \cdot h_{vap} \qquad \text{Eq. 16}$$

Where:
Q is the total energy stored in the condensation chamber 3 and compression duct 5
V is the volume of the condensation chamber 3 and duct 5 in m³. If a multitude of compression chambers are attached in parallel they must all be considered.
ρ is the density of the compressed vapor in kg/m³
$h_{vap}$ is the latent heat of vaporization of the vapor in J/kg The latent heat of vaporization, $h_{vap}$, and the density p are a function of the vapor and the pressure to which it has been compressed. However, the volume V is a design choice. Ensuring that the duct 5 is short and that the total volume of the compression chambers is small, with help reduce the overall volume of the compression chamber and the total stored energy.

The rate at which heat leaves the condensation chamber was expressed in Eq. 3 and is rearranged here:

$$\dot{Q} = \frac{\Delta T}{R} \qquad \text{Eq. 17}$$

Where:
$\dot{Q}$ is the rate at which heat is being transferred form the condensation chamber back to the evaporation chamber in J/s
ΔT is the temperature difference between the vapor in the condensation chamber and saturated liquid in the evaporation chamber.
R is the thermal resistance from the vapor in the condensation chamber 3 to the saturated water sitting on the heat transfer plate 4 in the evaporation chamber 2.

The relaxation time of the pressure in the condensation chamber can will be proportional to the ratio of Eq. 16 to Eq 17 as follows:

$$\text{Relaxaton Time} \propto \frac{Q}{\dot{Q}} = \frac{V \cdot \rho \cdot h_{vap} R}{\Delta T} \qquad \text{Eq. 18}$$

By ensuring the Relaxation Time as expressed in Eq. 18 is sufficiently small relative to the interval between compression strokes, the latent heat of vaporization in the condensation chamber has sufficient time to transfer to the evaporation chamber which allows the pressure in the condensation chamber to drop down suitably close to the pressure in the evaporation chamber. The key requirement is that the pressure in the evaporation chamber drops down to a pressure which is close to the pressure within the evaporation chamber. As such, at the beginning of the next compression stroke, the compressor valve linking the compression chamber of the respective bellows 11 or 12, can open linking the vapor in the bellows to the duct 5 and compression chamber 3, and the compression stroke proceeds along the saturated vapor line. As the bellows contracts, the pressure gradually and concurrently increases in the condensation chamber and vapor begins to condense on heat transfer surface 4. This allows the compression stroke to proceed along the saturated water line as opposed to adiabatically.

This consideration is not possible for a root blower type device which rotates at thousands of RPM and a rotary turbine of blower which rotates at tens of thousands of RPM. For these types of compressor's, the pressure in the condensation chamber gradually increases until a steady state is achieved. The compressor must therefore compress the vapor adiabatically from the intake pressure of the evaporation chamber, until the pressure at the output of the compressor is equal to the steady state pressure of the compression chamber. This is a key differentiation with the currently proposed invention which allows the compression stoke to occur along the saturated vapor line thereby achieving excellent thermodynamic efficiency.

ALTERNATIVE EMBODIMENTS

The preferred embodiments have described individual flat bed evaporators as well as interleaved evaporators, primarily because the small depth of brine results in very little hydrostatic pressure in the evaporator chamber, thereby ensuring that the boiling temperature of the fluid in contact with the heat transfer surface be as low as possible, minimizing the required pressure increase in the condensation chamber to effect liquification of the vapor. Additional benefits are their low manufacturing cost and ease of maintenance. Furthermore, for applications such as salt production where the solution must be dried out, flat bed evaporators are preferred. However, the same operating principle could be applied with conventional tube based heat exchangers. In fact, any type of heat exchanger which provides thermal coupling between the condensing vapor and the evaporating fluid, as the vapor is being compressed, could be used. The key operating principle of the current disclosure is that the vapor be compressed while it is in thermal contact with a heat transfer surface, such that the vapor be liquified while the compression is taking plate, such that the compression process follows the saturated water line as opposed to a constant entropy curve typical of adiabatic compressors. The production of super heated steam during the compression step is very undesirable due to the significant increase in required compressor work per kg of vapor. This is the key differentiation which enables reduced power consumption compared to current state of the art MVC systems which use adiabatic compression.

Furthermore, the preferred embodiments of the disclosure have described a bellows based compressor, primarily due to the desire to move a larger volume of water vapor with minimal energy loss due to friction or other dissipative effects. In order to distill 1000 kg of water, a total volume of 1674 cubic meters of water vapor must be compressed. Even a very modest amount of internal resistance in a piston based positive displacement compressor or roots type blower, could dissipate several kWh of energy when displacing such a large volume of vapor, even in the absence of a pressure differential. Most compressors are designed to impart a large pressure increase, in the range of a few atmospheres, potentially tens of atmospheres. Given the PV work is so large, a small amount of dissipated energy due to friction is not significant. For this system however, the objective is to maximize thermodynamic efficiency by using a very low differential pressure. The mechanical work requirement for a lossless compressor can be less than 1 kWh per 1000 kg of water vapor depending on the differential pressure used.

As such, it is necessary that the compressor be able to displace a large volume of vapor, 1674 m³ for example, while ensuring a very small fraction of the 1 kWh total energy requirement be lost to friction and other dissipative effects. In principle, any type of compressing device could be used which allows the vapor to be pressed into the condensation chamber, while it is in contact with the heat transfer surface, where the energy lost to friction and other dissipative effects is substantially less than the PV work being imparted to the steam.

INDUSTRIAL APPLICABILITY

Due to the increasing requirements to desalinated seawater using lower energy requirements, seawater distillation is the primary focus of the current invention. However, the current disclosure is applicable to any process where a liquid needs to be distilled for the purpose of separating it from other liquids, or separating the liquid from a solid, and it is desirable to minimize the amount of energy needed to enable the distillation or evaporation process. The system, methods and apparatus described in the current patent application will find applications in water desalination, ethanol production, sea salt production and the separation of organic compounds by distillation.

REFERENCES

1. Food and Water Organization of the United Nations (2021) Water scarcity. http://www.fao.org/land-water/world-water-day-2021/water-scarcity/en/Retrieved Jan. 10, 2021.
2. Busby, J. (2017, January) "Water and U.S. National Security", Council on Foreign Relations. https://www.cfr.org/sites/default/files/pdf/2017/01/Discussion_Paper_Busby_Water_and_US_Security_OR.pdf
3. Alkaisi, A., Mossad, R., Sharifian-Barforoush, A., (2016). A review of the water desalination systems integrated with renewable energy. 1*st International Conference on Energy and Power, ICEP*2016, 14-16 December, RMIT University, Melbourne, Australia.
4. Bhambare, P. S., Majumder., M. C., Sudhir, V. (2018). Solar Thermal Desalination: A Sustainable Alternative for Sultanate of Oman. *International Journal of Renewable Energy Research*, Vol. 8, No. 2, June.
5. Eshoul, N., Almutairi, A., Lamidi, R., Alhajeri, H., Alenezi, A. (2018). Energetic, Exergetic, and Economic Analysis of MED-TVC Water Desalination Plant with and without Preheating. *Water,* 10, 305.
6. Kenneth Wark Jr. (1988). Thermodynamics (5th ed.), McGraw-Hill.
7. Curto, D., Franzitta, V., Guercio, A. (2021). A Review of the Water Desalination Technologies. *Appl. Sci.* 2021, 11, 670.
8. Frank P. Incropera, David P. De Witt (1990). Introduction to Heat Transfer (Second Edition), John Wiley & Sons.

The invention claimed is:

1. A system for distilling a liquid using mechanical vapor recompression which comprises of:
   a. One or more evaporation chambers which contain a saturated liquid at its boiling temperature, thermally coupled to one or more condensation chambers which contain a saturated vapor at its condensation temperature;
   b. A compressor means comprising a first compressor means and a second compressor means to draw vapor from the said one or more evaporation chambers and compress the said vapor into the said one or more condensation chambers to create a differential pressure which results in a higher condensation temperature in the said one or more condensation chambers than the boiling temperature in the said one or more evaporation chambers;
   c. Where the said first compressor means and the said second compressor means operate in opposite phase such that the said first compressor means is drawing vapor from the said one or more evaporation chambers while the said second compressor means is compressing vapor into the said one or more condensation chambers, or vice versa;
   d. A heat transfer means between the said one or more condensation chambers and said one or more evaporation chambers to allow the latent heat of vaporization to be transferred from the said one or more condensation chambers to the said one or more evaporation chambers as the vapor condenses.

2. A system for distilling a liquid as defined in claim 1 where the liquid being distilled is seawater.

3. A system for distilling a liquid as defined in claim 2 where condensation is occurring on a surface of the heat transfer means within the said one or more condensation chambers such that the vapor in the said one or more condensation chambers forms a 2-phase liquid and vapor system during compression as opposed to superheated steam.

4. A system for distilling a liquid as defined in claim 2 where the said compressor means is comprised of two or more bellows which operate in oppose phase in a cyclical manner where a first bellows draws vapor from the said one or more evaporation chambers while a second bellows compresses vapor into the said one or more condensation chambers to create a differential pressure between the said one or more evaporation chambers and said one or more condensation chambers during half of the cycle while the first bellows compresses vapor into the condensation chamber and the second bellows draws vapor from the evaporation chamber during the second half of the said cycle.

5. A system for distilling a liquid as defined in claim 3 where the thermally coupled evaporation and condensation chambers comprise of:
   a. A top and bottom clam shell with a metal heat transfer surface separating the said top clam shell and said bottom clam shell where the said top clam shell and said metal heat transfer surface form a chamber which serves as the said evaporation chamber and the said bottom clam shell and said metal heat transfer surface form a chamber which serves as the said condensation chamber;
   b. A means for inputting seawater into the said evaporation chamber, a means for removing concentrated brine from the said evaporation chamber, and a means for withdrawing distilled water from the said condensation chamber;
   c. A duct leading out of the said evaporation chamber to carry vapor from the said compressor means and a second duct from the said compressor means to carry vapor to the said condensation chamber.

6. A system for distilling a liquid as defined in claim 5 further characterized by:
   a. A plurality of said thermally coupled evaporation and condensation chambers interleaved into a single physical unit;
   b. The said duct to carry vapor from the said plurality of evaporation chambers to the said compressor means;

c. The said second duct to carry vapor to the said plurality of condensation chambers from the said compressor means.

7. A system for distilling a liquid as defined in claim 2 where two or more said compressor means and two or more said evaporation chambers thermally couple to two or more said condensation chambers are contained in a thermally insulated structure, further characterized by:
   a. A heat exchanger to allow the incoming seawater to be heated by the outgoing desalinated water and outgoing concentrated brine;
   b. A thermal insulation sufficient to maintain the internal temperature of the said insulated structure at the evaporation temperature of the fluid in the evaporation chambers.

8. A system for distilling a liquid as defined in claim 2 where the said compressor means is capable of displacing 1000 kg of water vapor while dissipating less than 2.5 kWh of energy due to friction, viscous damping, pressure drop and other dissipative effects.

9. A system for distilling a liquid as defined in claim 2 where the said heat transfer means between the said one or more evaporation chambers and said one or more condensation chambers has a thermal resistance when expressed in ° C./Watt which is equal to or less than ($9.47 \times 10^{-7}$/distillation rate) where the distillation rate is expressed in kg per second.

10. A system for distilling a liquid as defined in claim 2 where the said heat transfer means between the said one or more evaporation chambers and said one or more condensation chambers has a thermal resistance when expressed in ° C./Watt which is equal to or less than ($2.44 \times 10^{-6}$/distillation rate) where the said distillation rate is expressed in kg per second.

11. A system for distilling a liquid as defined in claim 1 where the latent heat of vaporization of the said saturated vapor stored in the said one or more condensation chambers is sufficiently small relative to the rate of heat transfer across the said heat transfer means between the said one or more condensation chambers and said one or more evaporation chambers, such that a relaxation time as defined in equation 18, which specifies that the said relaxation time is equal to the volume of the said one or more condensation chambers expressed in $m^3$ multiplied by the density of the said saturated vapor in $kg/m^3$ multiplied by the enthalpy of vaporization of the said saturated vapor expressed in J/kg multiplied by the said thermal resistance of the said heat transfer means expressed in ° C./W divided by the temperature difference between the said saturated vapor in the said one or more condensation chambers and the liquid in the said one or more evaporation chamber expressed in ° C., be less or equal to the interval between compression strokes of the said compressor means.

12. A system for distilling a liquid using mechanical vapor recompression which comprises of:
   a. One or more evaporation chambers which contains a saturated liquid at its boiling temperature, thermally coupled to one or more condensation chambers which contain a saturated vapor at its condensation temperature;
   b. A compressor means comprising two or more compressor means to draw vapor from the said one or more evaporation chambers and compress the said vapor into the said one or more condensation chambers to create a differential pressure which results in a higher condensation temperature in the said one or more condensation chambers than the boiling temperature in the said one or more evaporation chambers;
   c. Where the said two or more compressor means operate such that when at least one said compressor means is compressing vapor into the said one or more condensation chambers, at least another said compressor means is drawing vapor from the said one or more evaporation chambers;
   d. A heat transfer means between the said one or more condensation chambers and said one or more evaporation chambers to allow the latent heat of vaporization to be transferred from the said one or more condensation chambers to the said one or more evaporation chamber as the vapor condenses;
   e. Where a relaxation time as defined in equation 18, which specifies that the said relaxation time is equal to the volume of the said one or more condensation chambers expressed in $m^3$ multiplied by the density of the said saturated vapor in $kg/m^3$ multiplied by the enthalpy of vaporization of the said saturated vapor expressed in J/kg multiplied by the thermal resistance of the said heat transfer means expressed in ° C./W divided by the temperature difference between the said saturated vapor in the said one or more condensation chambers and the liquid in the said one or more evaporation chamber expressed in ° C., be less or equal to the interval between compression strokes of the said compressor means.

13. A system for distilling a liquid as defined in claim 12 where the said compressor means is capable of displacing 1000 kg of water vapor while dissipating less than 2.5 kWh of energy due to friction, viscous damping, pressure drop and other dissipative effects.

14. A system for distilling a liquid as defined in claim 13 where the said heat transfer means between the said one or more evaporation chambers and said one or more condensation chambers has a thermal resistance when expressed in ° C./Watt which is equal to or less than ($9.47 \times 10^{-7}$/distillation rate) where the distillation rate is expressed in kg per second.

15. A system for distilling a liquid as defined in claim 14 where one or more said compressor means and one or more said evaporation chambers thermally coupled to the one or more said condensation chambers, are contained in a thermally insulated structure, further characterized by:
   a. A heat exchanger to allow an incoming fluid to be heated by an outgoing distilled fluid and an outgoing waste fluid;
   b. A thermal insulation sufficient to maintain the internal temperature of the said insulated structure at the evaporation temperature of the fluid in the said one or more evaporation chambers.

16. A system for distilling a liquid as defined in claim 15 where the said incoming liquid being distilled is seawater and the said outgoing distilled fluid is desalinated water.

17. A system for distilling a liquid as defined in claim 15 where the said incoming liquid being distilled is a mixture of an alcohol mixed with a water-based solution.

* * * * *